US012001363B2

United States Patent
Linder et al.

(10) Patent No.: US 12,001,363 B2
(45) Date of Patent: Jun. 4, 2024

(54) SECURE ENCLAVE SYSTEM-IN-PACKAGE

(71) Applicant: Octavo Systems LLC, Sugar Land, TX (US)

(72) Inventors: Peter Robert Linder, Sugar Land, TX (US); Masood Murtuza, Sugar Land, TX (US); Erik James Welsh, Bellaire, TX (US); William Arthur Fitzhugh Lee, Spicewood, TX (US)

(73) Assignee: OCTAVO SYSTEMS LLC, Sugar Land, TX (US)

( * ) Notice: Subject to any disclaimer, the term of this patent is extended or adjusted under 35 U.S.C. 154(b) by 0 days.

(21) Appl. No.: 17/926,438

(22) PCT Filed: May 21, 2021

(86) PCT No.: PCT/US2021/033667
§ 371 (c)(1),
(2) Date: Nov. 18, 2022

(87) PCT Pub. No.: WO2021/237099
PCT Pub. Date: Nov. 25, 2021

(65) Prior Publication Data
US 2023/0185748 A1 Jun. 15, 2023

Related U.S. Application Data

(60) Provisional application No. 63/029,037, filed on May 22, 2020.

(51) Int. Cl.
*G06F 13/36* (2006.01)
*G06F 15/78* (2006.01)

(52) U.S. Cl.
CPC .......... *G06F 13/36* (2013.01); *G06F 15/7807* (2013.01)

(58) Field of Classification Search
CPC .............. G06F 15/7807; G06F 15/781; G06F 15/7814; G06F 15/7817; G06F 15/7832; G06F 15/7835; G06F 15/7842; G06F 13/36; G06F 13/385; G06F 13/387;
(Continued)

(56) References Cited

U.S. PATENT DOCUMENTS

| 2017/0372076 A1 | 12/2017 | Poornachandran et al. |
| 2019/0121981 A1 | 4/2019 | Fu et al. |
| 2022/0366091 A1* | 11/2022 | Fransis ................. H01L 23/36 |

OTHER PUBLICATIONS

International Search Report and Written Opinion issued for International Application No. PCT/US2021/033667 dated Aug. 24, 2021, 7 pages.

* cited by examiner

*Primary Examiner* — Raymond N Phan
(74) *Attorney, Agent, or Firm* — ROTHWELL, FIGG, ERNST & MANBECK, P.C.

(57) ABSTRACT

A Secure Enclave SiP (SE-SiP) is disclosed. The SE-SiP provides all the security benefits of a system designed using a Trusted Platform Module (TPM), replaces the need to trust a general-purpose CPU chip vendor with the need to trust a much simpler more trustworthy configurable device, and replaces the need to trust the entire system motherboard manufacturer with the much more limited need to trust the SE-SiP manufacturer. It can provide privacy for the software and data sent to the system, resident on it, or retrieved from it, with respect to all parties—including the person/party in physical possession of the device.

18 Claims, 24 Drawing Sheets

(58) Field of Classification Search
CPC ... H04L 9/3247; H04L 9/4401; H04L 63/107; H04L 21/572; H04L 21/34
See application file for complete search history.

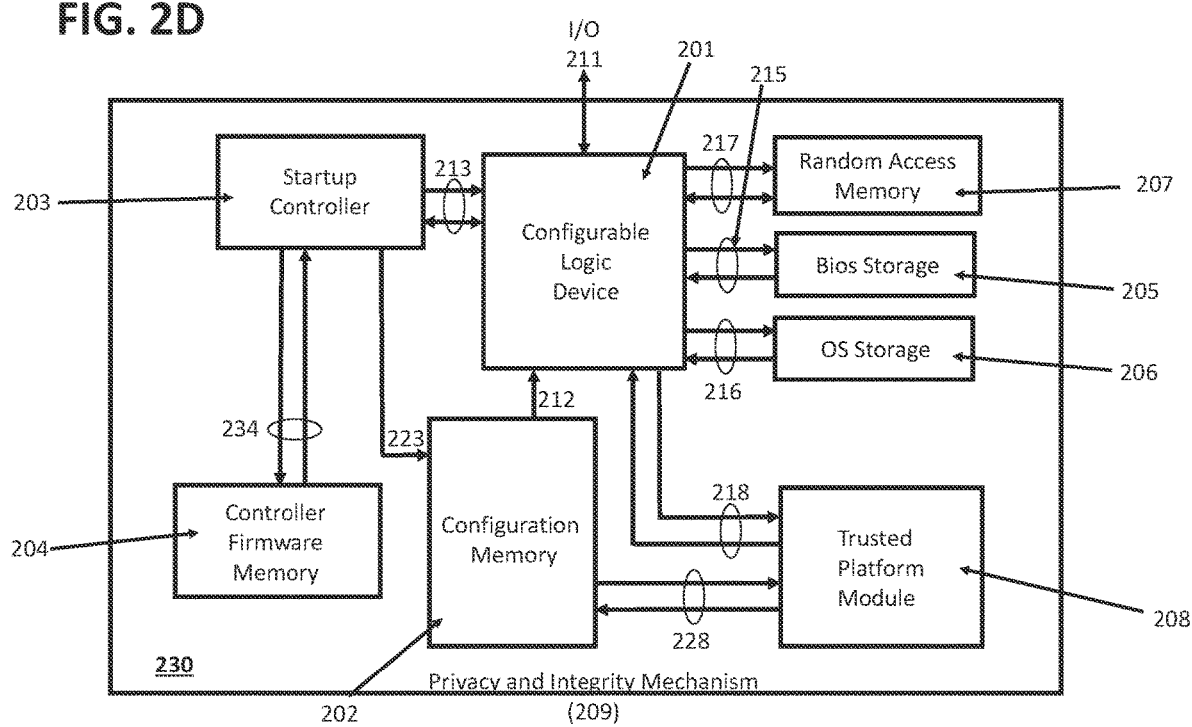

FIG. 10B

| | Passive 1042 | Active 1044 |
|---|---|---|
| SE-SiP OFF 1041 | Incorporate Protective Shield to prevent an intruder from evaluating SE-SiP circuits and/or stored data by external observation methods. 1051 | Low power monitor detects physical intrusion and sets in motion a protective response such as 1) erasing all non-volatile memory, or 2) self destructing. 1052 |
| SE-SiP ON 1043 | Incorporate Protective Shield to prevent data or configuration information from radiating from the SE-SiP and being captured by an intruder. 1053 | SE-SiP 1) turns off to erase volatile memory, 2) erases both volatile and non-volatile memory, 3) implements active data leakage countermeasures, or 4) self destructs. 1054 |

1040

1060

SECURE ENCLAVE SYSTEM-IN-PACKAGE

CROSS REFERENCE TO RELATED APPLICATION(S)

This application is a 35 U.S.C. § 371 National Stage of International Patent Application No. PCT/US2021/033667, filed May 21, 2021, designating the United States, which claims the benefit of U.S. Provisional Application No. 63/029,037, which was filed May 22, 2020, the disclosures of which are incorporated herein in their entirety by reference.

TECHNICAL FIELD

Aspects of this disclosure relate to system-in-package (SiP) devices, secure systems and protections, and more particularly, a system with a secure enclave and a privacy/integrity mechanism (PIM).

BACKGROUND

System-on-a-Chip ("SoC") refers to a device currently used in the semiconductor industry that incorporates different functional circuit blocks that are part of a single monolithic block of silicon to form a system. Systems in a Package ("SiP") devices are currently used in the semiconductor industry to assemble, for instance, multiple integrated circuits, other devices, and/or passive components in one package.

A standard remote server today, whether in the "cloud" or not, typically includes a commercially available general purpose CPU. The server system provides remotely accessible functionality that allows the remote user to send code and data to the CPU, then interact with it and retrieve computation or other type of results from it.

There remains a need for improved security and privacy protections in electronic systems.

SUMMARY

Aspects of the present disclosure overcome certain disadvantages of existing systems, and provide a secure enclave system in package (SE-SiP). In some embodiments, a SE-SiP may be provided as a part of a server or other device. In other embodiments, a SE-SiP may be provided as a server or other device, itself.

According to embodiments, a secure enclave SiP (SE-SiP) device is disclosed to provide hardware based, security-related functions and improve the trustworthiness of the overall system. A SE-SiP can be a general-purpose next-generation security building block that provides all the security benefits of a system designed using a TPM.

In some embodiments, a secure enclave SiP (SE-SiP) device replaces the need to trust a general-purpose CPU chip vendor with the need to trust a much simpler and more trustworthy configurable device, such as a processing element based on a configurable logic device (CLD) or a field programmable gate array (FPGA). A SE-SiP can be more trustworthy, as the CPU function of the CLD or FPGA is determined by a memory which stores the configuration of the CPU to provide limited and specific functionality. In addition, the secure enclave SiP (SE-SiP) device can eliminate, in some instances, the need to trust a general purpose CPU chip manufacturer, while it also replaces the need to trust the entire system motherboard manufacturer with only the need to trust the SE-SiP manufacturer. In some embodiments, the SE-SiP can even eliminate the need to trust the SE-SiP manufacturer as security is provided by a programmable hardware such as CLD or FPGA to which the SE-SiP manufacturer does not have any access.

In some embodiments, using a secure enclave SiP (SE-SiP) device in a system provides privacy for the software and data sent to the system, resident on it, or retrieved from it, from all parties including the person in physical possession of the server by limiting access to the device using a single I/O port controlled by the programmed CLD or FPGA acting as a CPU. The device comprises a configuration memory for configuring the CLD or FPGA to implement the desired CPU with limited functionality and may also comprise firmware and/or instructions for starting up and operating the configured CPU.

As part of the SiP design, privacy and integrity are improved as they are physically protected by the construction of the SiP. When additional functional units are added to the SiP, the user does not need to be concerned as long as they are enclosed in the SiP and have no physical or wireless connection capability from outside of the SE-SiP other than a single in and out (I/O) port of the SE-SiP.

The physical protection used to create the secure enclave in the SiP may be, but are not limited to, metal enclosures, non-destructible materials, or tamper proof packaging materials.

In some embodiments the added functional units, such as for example, but not limited to microcontrollers or microprocessors, may be included in the SE-SiP device. In some embodiments, the configuration memory and the microcontroller firmware may be included as part of the microcontroller. In some embodiments a TPM may be included in, but not limited to, the configurable logic device, the added controller, or added microprocessor.

According to embodiments, an apparatus (e.g., a SE-SiP) is provided. The apparatus may comprise: at least one startup component (e.g., startup controller, initializer, or sequencer); at least one programmable hardware device (e.g., a trusted processor, analog processor, digital processor, mixed-signal device, microprocessor, optical device, programmable hardware device, or configurable logic device (CLD)); and a trust component (e.g., a trusted platform module (TPM) or root of trust component), wherein the startup component, programmable hardware device, and trust component are packaged together to form a System-in-Package (SiP) device.

According to embodiments, a method of using or configuring such an apparatus is provided. The method may comprise, for instance, the steps of: performing a power-up or reset; configuring one or more programmable hardware devices using the startup component in response to the power-up or reset; performing one or more verification operations using the trust component; and performing one or more input/output operations after a successful verification operation.

According to embodiments, a method of assembling such an apparatus is provided. This could comprise, for instance, the steps of: mounting and interconnecting the startup component, programmable hardware device, and trust component on a SiP substrate; and packaging the components to form a SE-SiP.

According to embodiments, a method is provided. The method may comprise: performing a power-up or reset operation; preparing configuration data (e.g., by a startup controller in a configuration memory, using code in a controller firmware memory); configuring a device, such as a CLD (e.g., using the configuration data); executing first instructions (e.g., the CLD begins executing instructions); receive second code; performing code verification on the second code; and executing second instructions based on the received second code (e.g., the CLD begins operation).

In some embodiments, a SiP device is disclosed. The SiP device may comprise: one or more electronic components; and a privacy and integrity mechanism (PIM) for those components.

In some embodiments, a method is disclosed. The method may comprise: measuring one or more detection values preselected/predetermined (e.g., capacitance, inductance, resistance, frequency, temperature); comparing a present value with one or more previous values; determining that a threshold has been exceeded, and in response, performing an intrusions response action.

In some embodiments, a method of programming a remotely configurable SE-SiP is provided. The method may comprise: initializing a logic device (e.g., an init CLD) using a verified initial configuration memory of the SE-SiP, wherein the programmable hardware device has an existing (e.g., factory programmed) configuration in memory and/or BIOS storage; verifying the content of the initial configuration memory (and, e.g., BIOS storage) with a trust component of the SE-SiP; retrieving data (e.g., instructions to startup component, instructions for the init CLD, configuration data for main CLD, BIOS and/or OS for new element created on main CLD, or other data such as verification code or generic data); verifying the data; storing the retrieved and verified data in a main configuration memory (e.g., in main BIOS storage and OS storage); and configuring a main programmable hardware device using the main configuration memory and an initialization programmable hardware device.

According to embodiments, one or more configuration processes are disclosed. These include, for instance, preprograming at the factory stage, configuration after deployment, and multi-step configuration after deployment.

These and other features of the disclosure will become apparent to those skilled in the art from the following detailed description of the disclosure, taken together with the accompanying drawings.

BRIEF DESCRIPTION OF THE DRAWINGS

FIGS. 2A, 2B, 2C and 2D illustrate aspects of a SE-SiP according to embodiments of the present disclosure.

FIGS. 10B and 10C depict methods for detecting and/or preventing an intrusion according to embodiments of the present disclosure.

DETAILED DESCRIPTION

Figure 1:
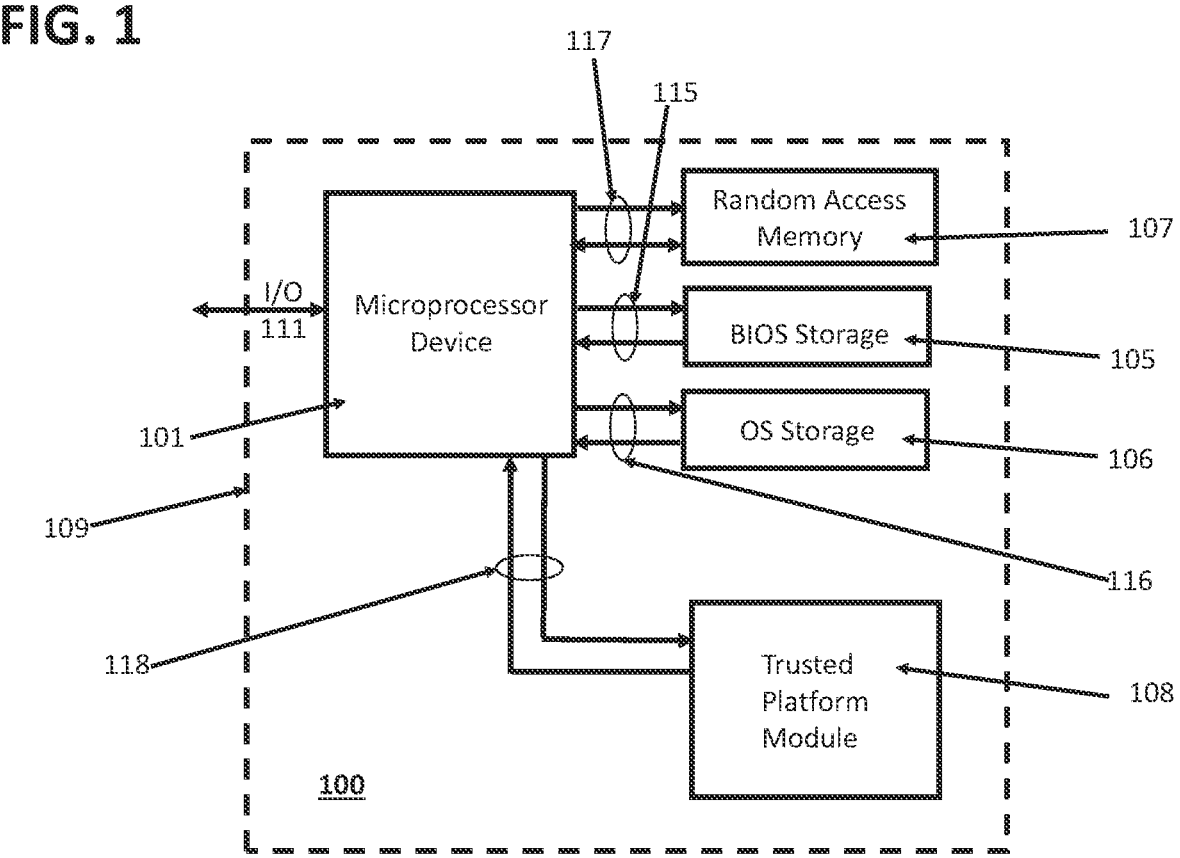
FIG. 1 is a block diagram of a secure server.

Using a Trusted Platform Module (TPM) in a system, such as a server system, can make it possible to verify the system manufacturer authenticity. It also can make it possible to verify the contents of the firmware memory which contains the boot code for the CPU as well as other locally stored code such as the Operating System. In certain aspects, a trusted platform module (TPM) may be an electronic device that meets all of the requirements of the ISO/IEC 11889 standard/specification and is a limited functionality security building block, for example. Other standards for TPM may be used. A TPM may be designed to provide hardware-based, security-related functions. A TPM chip may be a secure crypto-processor that is designed to carry out cryptographic operations. The chip could include, for instance, multiple physical security mechanisms to make it tamper resistant, where malicious software by itself is unable to tamper with the security functions of the TPM.

A TPM might support only the functionality of storing secure information that cannot be read out, and of using the secure information by encrypting and decrypting data or other information. Such a system would require trust in the CPU manufacturer as well as the motherboard manufacturer. Further, such a TPM based server system may not also provide privacy of code or data from the person in actual physical possession of the server.

An issue with current system implementations is that the remote user must trust the manufacturer of the remote server and the manufacturer of the highly complex, highly opaque, and often historically buggy or willfully trust-compromised general purpose CPUs with either hardware and/or software backdoors. Further, once compromised, the user cannot expect privacy of the software or data sent to the server, resident on the server, or retrieved from the server.

According to embodiments, improved secure systems and privacy protections are provided.

In this disclosure, the terms—Configurable Logic Device (CLD), logic device, and programmable hardware—are used interchangeably.

As used herein, the term Configurable Logic Device (CLD) may comprise any electrical circuit/component with an array of programmable logic gates. Examples of such CLDs are Field Programmable Gate Arrays (FPGAs), Complex Programmable Logic devices (CPLDs), Field Programmable Analog Arrays (FPAAs), or any device which may be electrically or mechanically configured to perform computational functions by way of a configuration memory. A configuration memory can be, for example, any storage device, either digital or analog, containing the information, instructions or data necessary to configure the CLD.

According to embodiments, a Trusted Platform Module (TPM) may be a device that protects the program and data of a trusted processor. It is sometimes called a "Root of Trust" device or, generally, a security device. When the word or term, "Trusted Platform Module", "TPM", or "Root of Trust" is used herein it may refer to a component/device that performs one or more of, but is not limited to, the following functions: (1) Random number generation, (2) Cryptographic functions (encryption and decryption), (3) Hash calculations, (4) Key generation, (5) Key and Hash non-output internal storage and their usage, or (6) platform configuration register (PCR) storage and usage, or a secure equivalent to any of the foregoing. A hash calculation typically involves generating a fixed length deterministic and non-reversible cryptographic representation for an input data set or document using a known mathematical function.

According to embodiments, a Secure Enclave SiP (SE-SiP) of the present disclosure is a general-purpose next-generation security building block that provides the security benefits of a system designed using a TPM and replaces the need to trust a general-purpose CPU chip vendor with the need to trust a simpler and trustworthy configurable hardware device that provides privacy for the software and data sent to the system, resident on it, or retrieved from it from all parties including the person in physical possession of the system or server. A SE-SiP embodiment of the present disclosure replaces the need to trust the entire system motherboard manufacturer with the much more limited need to trust a SE-SiP manufacturer.

FIG. 1 depicts a portion of a block diagram of a typical secure server system 100. The system 100 comprises a standard general-purpose microprocessor or microcontroller device 101 (typically supplied by Intel™, AMD™ or ARM™), Random Access Memory (RAM) 107, BIOS Storage 105, Operating System (OS) Storage 106 and a Trusted Platform Module (TPM) 108. The system 100 communicates with the outside world through its input/output (I/O) port 111. The microprocessor device 101 communicates with RAM 107 with dedicated address and data buses 117. In the same way, the microprocessor device 101 communicates with BIOS Storage 105 and OS Storage 106 with dedicated address and data buses 115 and 116, respectively. TPM 108 interfaces with the microprocessor device 101 via address and data buses 118. With minimal physical and electrical security and privacy for this type of device, there are many known ways to compromise the incoming data and execution code, its internal data or its transmitted data. For example, the microprocessor device 101 may be highly complex, highly opaque and often historically buggy or has willfully trust-compromised components as a result of, but not limited to, generations of microprocessor architectural advances and the need for 100 percent test coverage. A microprocessor may also have had malicious or undocumented modifications of complex architectures for undisclosed purposes (e.g., "backdoors").

One embodiment of the SE-SiP of the present disclosure comprises a system in package (SiP) plus TPM functionality (discreet or equivalent) and a PIM (e.g., for tamper protection). A trusted processor and associated initializer may be used, and a CLD is one hardware implementation. This is illustrated, as an example, in FIGS. 2B and 2C. In addition to the above components of the SE-SiP, other components may be added such as, for example, but not limited to, power management to include an energy source and energy storage, sensors, actuators, and wired or wireless communication devices.

Figure 2A:
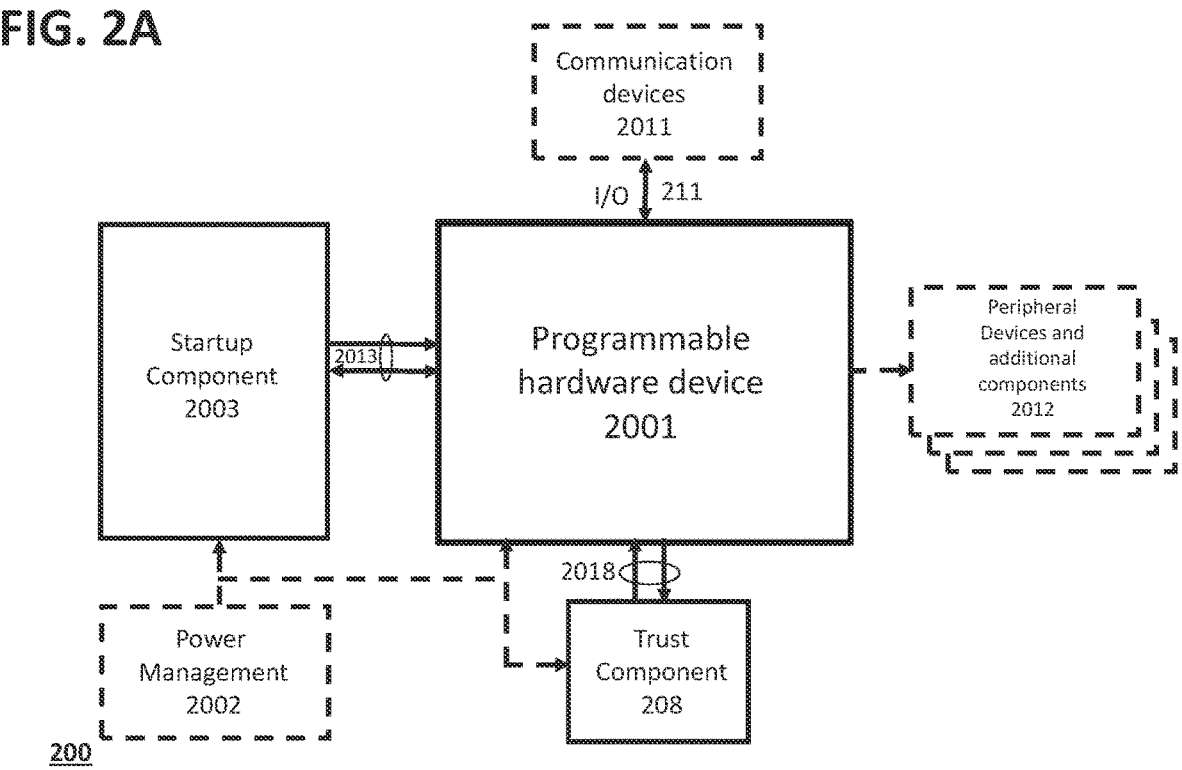
Figure 2B:
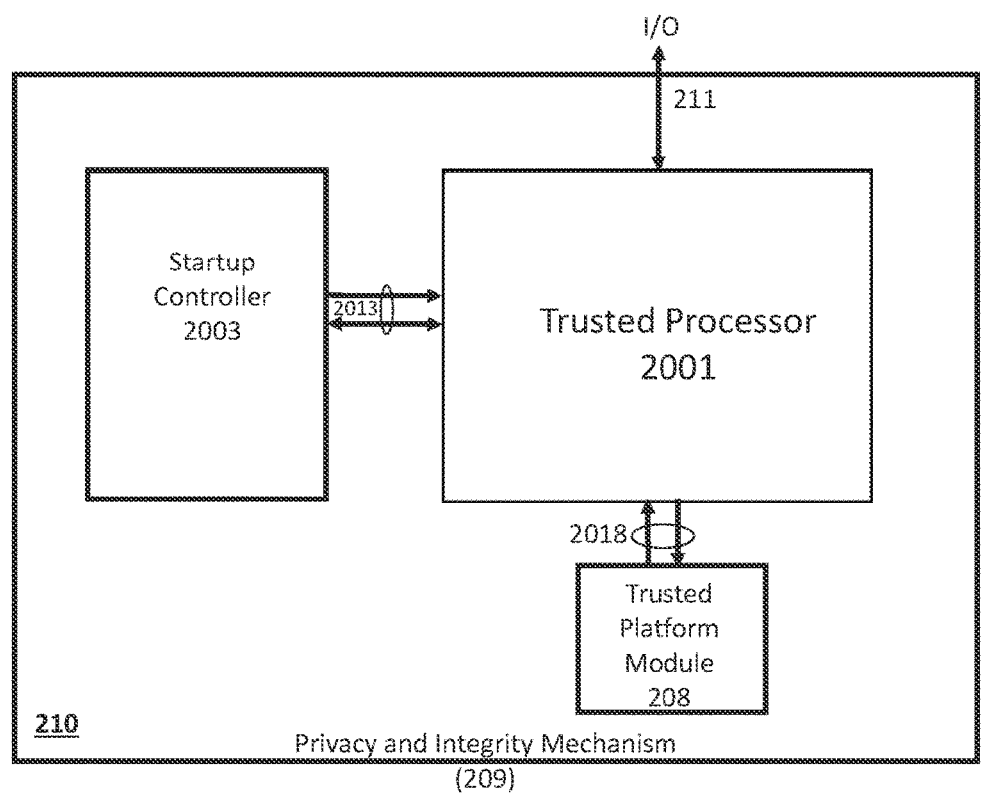
Figure 2C:
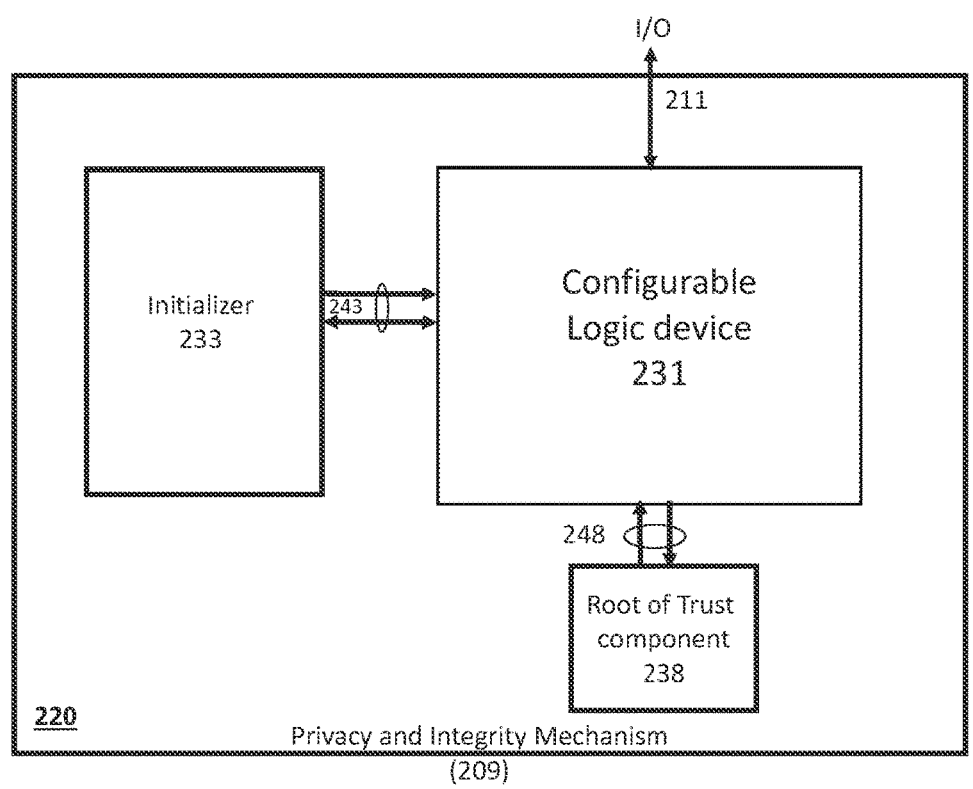

FIGS. 2A, 2B, 2C and 2C depict embodiments of the present disclosure. FIG. 2A depicts a simplified block diagram of a system 200 according to some embodiments. In some embodiments, the system 200 is a SiP device comprising non-SiP components. But in other embodiments, the system 200 may comprise one or more SiPs. In further embodiments, the system 200 is a SiP that comprises one or more SiPs. The system 200 may comprise a programmable hardware device (e.g., trusted processor) 2001, a startup component (e.g., controller) 2003 and a trust component 208, such as a Trusted Platform Module (TPM) or other root of trust element. The startup component 2003, upon power on or reset of the system 200, configures the programmable hardware device 2001 via buses 2013. The trust component 208 verifies that the programmable hardware device has been configured properly via buses 2018; although not depicted or used in all embodiments, the trust component 208 may also be connected to startup component 2003. Once operational, the logic device 2001 may begin executing stored instructions and control the single I/O port 211. In addition to the above components of the system 200, other components may be added to the system 200, such as, for example, but not limited to, power management component(s) 2002 (including an energy source and energy storage), and peripherals 2012 such as sensors, actuators, and communication devices/components 2011 either wired or wireless.

FIG. 2B depicts an embodiment of the present disclosure (e.g., related to FIG. 2A) with a Privacy and Integrity mechanism (PIM) 209 which may be used to physically protect the integrity of the programmable hardware device 2001 (e.g., a Trusted Processor implemented on the programmable hardware device 2001 in this example), while the trust component (e.g., a TPM in this example) is used to electrically protect the integrity of the Trusted Processor 2001. For example, in some embodiments, a packaged SE-SiP protected by the PIM 209 provides physical protection for the programmable hardware device 2001. Thus, it may be seen that one aspect of the present disclosure is to provide both physical and electrical protection for at least a part of the system 200. Further, according to some embodiments, a PIM comprises devices or structures which prevent the inspection or alteration of the physical and electrical structures stored within a packaged SE-SiP 210 (or SiP). Thus, both privacy and integrity of a packaged SE-SiP are protected. The PIM 209 may also detect any exterior tampering or modification. Such detection/inspection of the exterior tampering or modification may be performed electronically and/or visually (See FIG. 10B later herein for further discussion).

FIG. 2C depicts a SE-SiP 220 according to some embodiments. Unlike SE-SiP 210 shown in FIG. 2B, in SE-SiP 220, a simpler initializer 233 is provided instead of the startup component 2003. The initializer 233 causes a sequence of events to occur at a Configurable Logic device (CLD) 231 by sending signals to the CLD 231 via the communications lines 243. The sequence of events may be necessary to configure the CLD 231. Further, the TPM 208 of FIG. 2B is replaced with a simpler Root of Trust Component 238. As in FIG. 2B, a Privacy and Integrity mechanism (PIM) 209 may be included to physically protect the integrity of the CLD 231, while the trust component is used to electrically protect the integrity of the CLD 231. Like the SE-SiP 210, the SE-SiP 220 provides both physical and electrical protection for the components inside the SE-SiP 220.

FIG. 2D depicts a SE-SiP 230 according to some embodiments of this disclosure. Like the partial server or system depicted in FIG. 1, the SE-SiP 230 employs a processor 201. However, in the embodiment of FIG. 2D, the processor is at least a portion of a Configurable Logic Device (CLD) 201 with a configuration memory 202 used to configure at least a portion of the CLD 201 to implement the intended processor with selected functionality. The CLD 201 is configured using the configuration memory 202 via address and data buses 212. Once configured, the CLD 201 communicates with the BIOS Storage 205 via address and data buses 215 to initiate processing. The CLD 201 likewise communicates with RAM 207 via address and data buses 217, OS Storage 206 via address and data buses 216, and the TPM 208 via address and data buses 218. The CLD also communicates with the Startup Controller 203 via address and data buses 213. Further the Startup Controller communicates with controller firmware memory 204 and the configuration memory 202 via address and data buses 234 and 223, respectively. Once verified by the TPM 208 and functional, the SE-SiP 230 communicates with the outside world through its I/O port 211, which is controlled by the configured CLD in this example. In addition, although not depicted in FIG. 2D, the embodiment of FIG. 2D may include additional components and devices, as depicted in FIG. 2A, and as described earlier herein.

According to embodiments, an added level of physical security and privacy is made possible because all of the multiple components and devices are integrated into a SE-SiP. Further, with an appropriate Privacy and Integrity Mechanism (PIM) 209 included as part of the SiP encapsulation, the system 200 can be further physically protected. The PIM 209 is primarily designed to be tamper resistant by, for example, but not limited to, preventing physical or electrical access to or modification of the physical package, components or interconnects, preventing undesired physical modification to or inspection of the data contained in the memories or storages 202, 204, 205, 206 and 207, and preventing modification to, or inspection of the electrical state of the processing elements 201 and 208, or any of their interconnecting signals travelled through the buses 217. The PIM 209 may also be used to provide additional functions, such as, for example, but not limited to, RFI isolation, radiation shield, heat shield, and temperature and heat dissipation management.

According to embodiments, the start-up controller 203 is responsible for the booting of the system 200 (e.g., SE-SiP). The booting sequence is stored in the controller firmware memory 204. This booting process may be a very simple sequence or a more complex sequence depending on the needs of the SE-SiP system. The start-up controller 203 may be as simple as a programmable logic device (PLD) or a simple microcontroller (e.g., 4 bit MCU, or an ARM M0), or a more complex microprocessor (e.g., an ARM A8, A11, etc.). The start-up controller 203 and controller firmware memory 204 may also be included as part of the CLD 201, as either a hardware or software block on the CLD 201 (e.g., as described later herein regarding FIG. 7).

The configurable logic device (CLD) 201 may be a Field Programmable Gate Array (FPGA) with the configuration stored in the configuration memory 202, or may be a one-time configurable logic device. It may be as simple as containing a few thousand equivalent logic gates to containing a significantly larger number of equivalent logic gates. As may be seen in later figures (e.g., FIGS. 4, 5A-5B, and 6A-6C), the CLD 201 of FIGS. 2C and 2D may also be composed of an array of CLDs. A simpler architecture of the CLD 201 may increase the security of the overall SE-SiP as it becomes easier to find unwanted logic elements as the structure becomes simpler, and more regular providing two benefits: (1) an easily verifiable structure and (2) quickly display any lack of homogeneity, therefore giving predictability of functionality and configuration of a CLD.

The TPM 208 may be a stand-alone device/component, as shown in FIG. 2D or may be part of the CLD 201 once configured. Other embodiments include the use of a two part BIOS Storage 205 where a first part of the BIOS storage contains an initial fixed preprogrammed BIOS and a second part of which may be configured to add to or replace the initial BIOS at a later time, prior to or after initialization of the CLD (e.g., as described later herein for FIG. 7).

Figure 3:
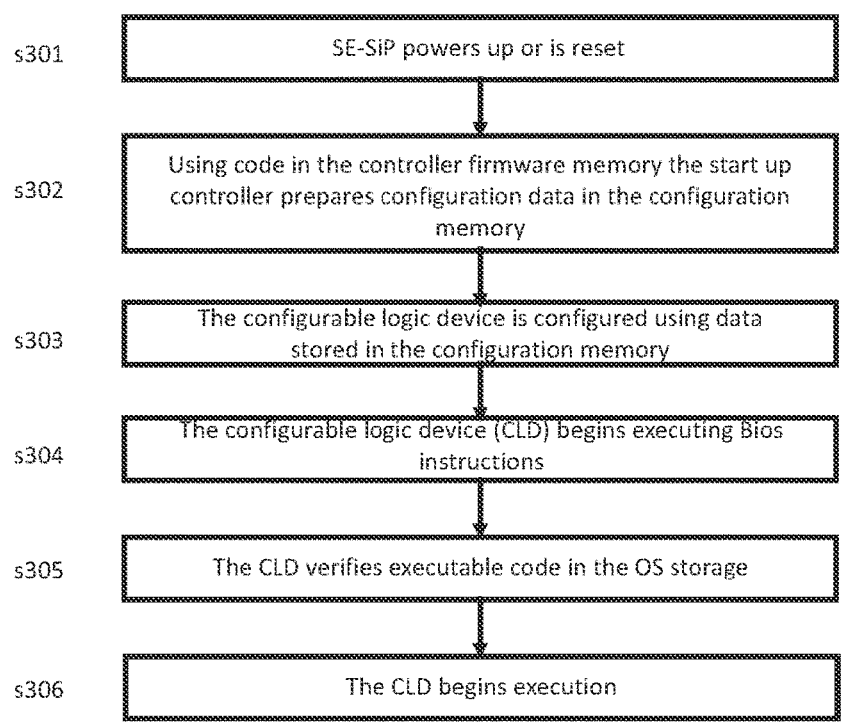
FIG. 3 depicts a method for initializing a SE-SiP according to embodiments of the present disclosure.

FIG. 3 depicts a method 300 for initializing a Secure Enclave SiP (SE-SiP) device (e.g., the system 200) according to embodiments. This may be used, for instance with a device as shown in FIGS. 2A-2D. Upon the SE-SiP being powered up or being reset in step s301, the start-up controller (such as, for example, but not limited to item 203 of FIG. 2D) using the program stored in the controller firmware memory (such as, for example, but not limited to item 204 of FIG. 2D) reads in step s302 the configuration data in the configuration memory (such as, for example, but not limited to item 202 of FIG. 2D). The configurable logic device (CLD) is configured in step s303 using the data stored in the configuration memory (such as, for example, but not limited to item 202 of FIG. 2D). Once configured, the processor implemented in at least a portion of the CLD (such as, for example, but not limited to item 201 of FIG. 2D) begins to execute in step s304 instructions stored in BIOS Storage (such as, for example, but not limited to item 205 of FIG. 2D). The processor implemented in the CLD verifies in step s305 executable code in the OS storage (such as, for example, but not limited to item 206 of FIG. 2D). The verification of the code involves, as an example, either the CLD, or the TPM, generating a separate hash code or signature for the actual BIOS code and the OS code, and then comparing those generated hash codes with the hash codes already stored in the read only memory (ROM) of the TPM itself for those BIOS and OS codes. The TPM may also contain ROM code for calculating a hash in addition to storing one or more hash values. Finally, the CLD begins execution of the OS in step s306.

Figure 4:
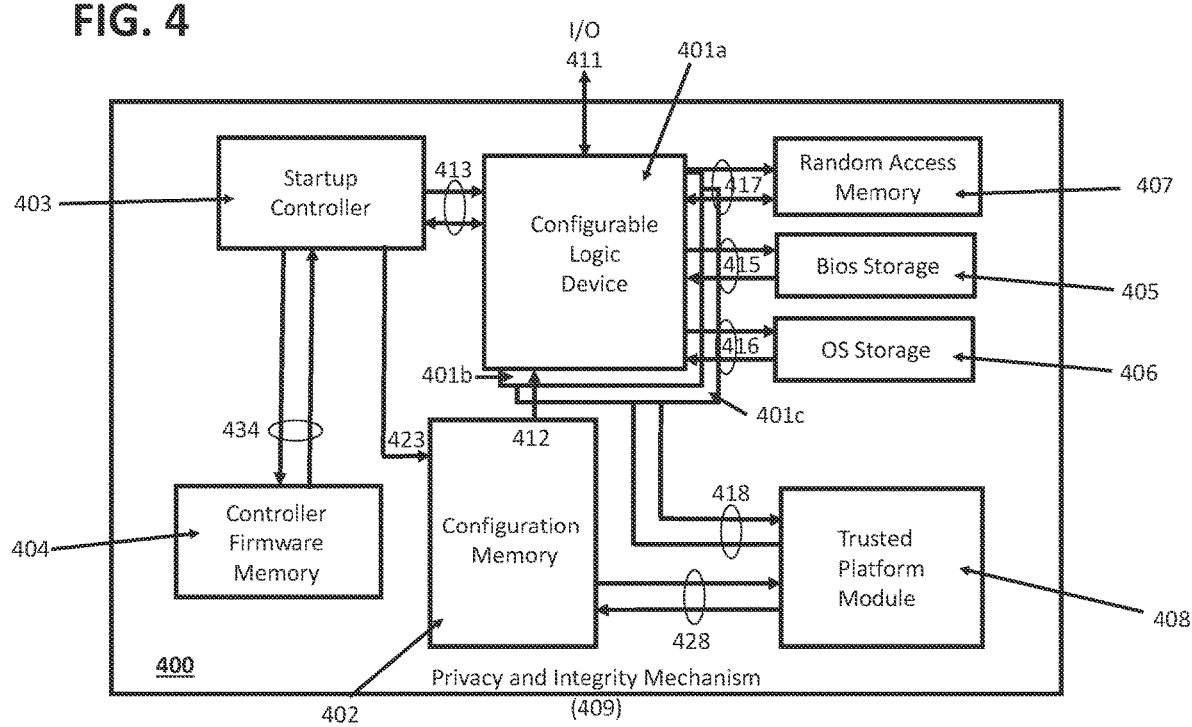
FIG. 4 illustrates aspects of an expandable SE-SiP according to embodiments of the present disclosure.

FIG. 4 shows a system 400 according to some embodiments. The system 400 may be an expanded performance Secure Enclave System in Package (SE-SiP). In certain aspects, the system 400 may have modifiable functionality, configurable performance, re-configurable features, and one or more field adaptable functions.

In this embodiment, the system 400 comprises a Startup Controller 403 with controller firmware memory 404, which contains and executes the power up sequence for the SE-SiP when powered up or reset. The system 400 comprises multiple Configurable Logic Devices (CLDs) 401*a*, *b*, and *c* with associated common configuration memory 402, common BIOS Storage 405, common OS Storage 406 and common Random Access Memory 407. As shown, for instance, in FIGS. 5B, 6B and 6C, the CLDs may share the resources 402, 405, 406 and 407, or each CLD may have its own unique set of resources, or there may be some combination of the resources assigned to each CLD in the array. Once each CLD is verified by a Trusted Platform Module (TPM) 408 as described earlier herein and functional, the system 400 communicates with the outside world through its I/O port 411 with a preselected CPU implemented in at least a portion of a CLD controlling those communications and using the TPM to verify the correctness of some of those communications. The system 400 may correspond to a Privacy and Integrity Mechanism (e.g., as depicted in FIG. 2C as items 208 and 209, respectively). The elements 412-413, 415-418, 423, 428, and 434 correspond to buses used for sending and/or receiving data between various components included in the system 400.

Figure 5A:
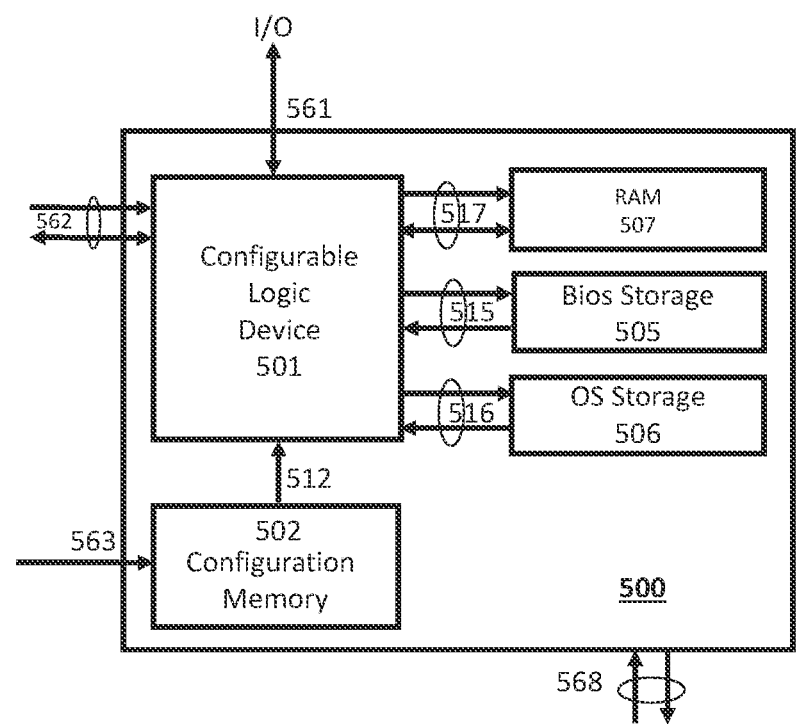
FIG. 5A illustrates an expandable SE-SiP sub-module according to embodiments of the present disclosure.

FIG. 5A depicts an embodiment of a sub-module 500 in which a CLD 501 and its resources, 502, 505, 506 and 507 are contained. Communication between the CLD 501 and the resources may be made, for instance, via connections 512, 515, 516, and 517 (e.g., one or more buses).

Figure 5B:
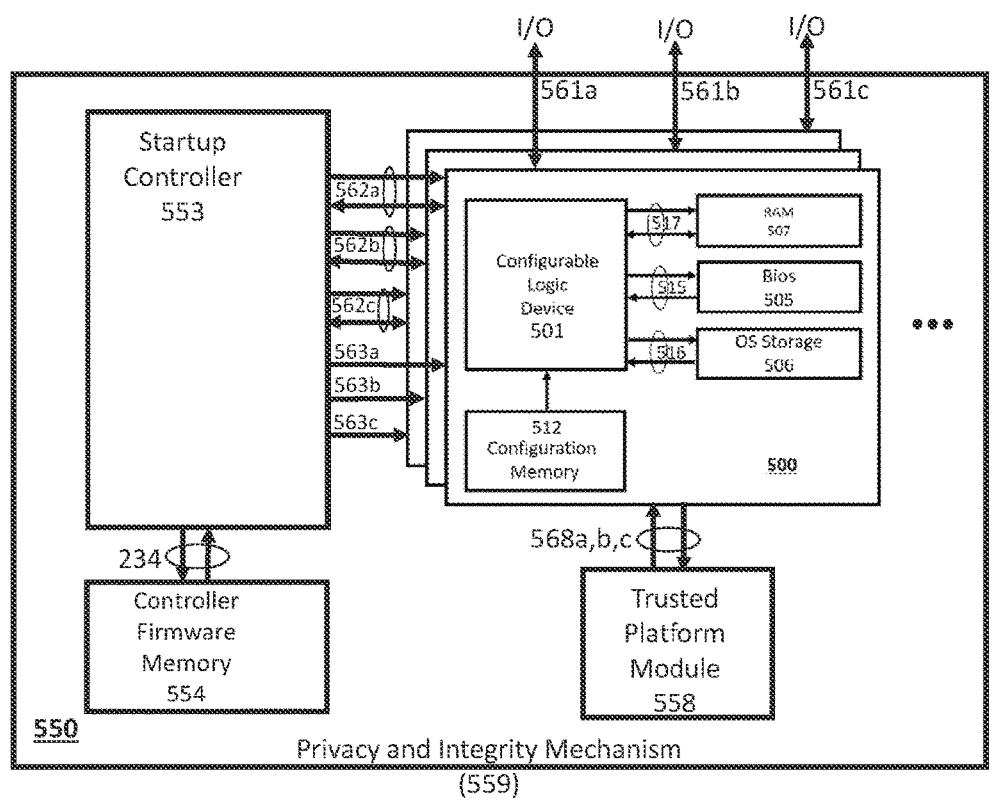
FIGS. 5B illustrates aspects of an expandable SE-SiP using the expandable SE-SiP sub-module depicted in FIG. 5A, according to embodiments of the present disclosure.

FIG. 5B depicts a system 550 according to some embodiments. The system 550 may be a SE-SiP that includes one or more of the CLD modules 500. The signals 561a-c, 562a-c, 563a-c, and 568a-c may be brought out of each of the sub-modules 500 or they may be appropriately connected within (not shown) the system 550 to assure they remain within the SE-SiP. In some embodiments, the system 550 is a SE-SiP. In such embodiments, signals 561a-c cannot leave the SE-SiP (outside of the PIM) without breaking the security model. That is, in such example, the communication between each of the CLD modules 500 and the TPM 558 must remain inside the SE-SiP.

In certain aspects, FIG. 5B depicts an embodiment for an SE-SiP by attaching one or more (three in this example) modules 500 of FIG. 5A to the substrate of the SE-SiP 550. The modules 500 may be stacked or arrayed by attaching them, for example, but not limited to, using one edge of the module's substrate, or attaching the components directly and electrically to the substrate of the SE-SiP 550. In this example, each CLD 501 included in in module 500 has a complete set of resources and each CLD 501 is connected to the Startup Controller 553 and Trusted Platform Module 558. This assures that the modules 500 are part of the SE-SiP 550 with its protection mechanisms, for example, but not limited to a TPM 558 and a PIM 559, respectively.

Continuing to refer to FIG. 5B, depending on the requirements of the system 550 (e.g., SE-SiP), portions of the firmware in the controller firmware memory 554 and/or in the module configuration memories 502 may be configured prior to the sub-module 500 being integrated into the SE-SiP 550 to, for example, but not limited to, create a base configuration to the CLDs 501. This may be implemented, for example, as illustrated with respect to FIG. 7. The sub-module 500 may be implemented in the SE-SiP 550 either by using discrete devices attached to the substrate of the SE-SiP 550, or by creating a daughter SiP (not shown) by attaching the components which make up the sub-module 500 on a substrate. The I/O signals 561a-c may be separately available or may be combined by means of wired-, multiplexing, or some other scheme into one or more buses.

Figure 6A:
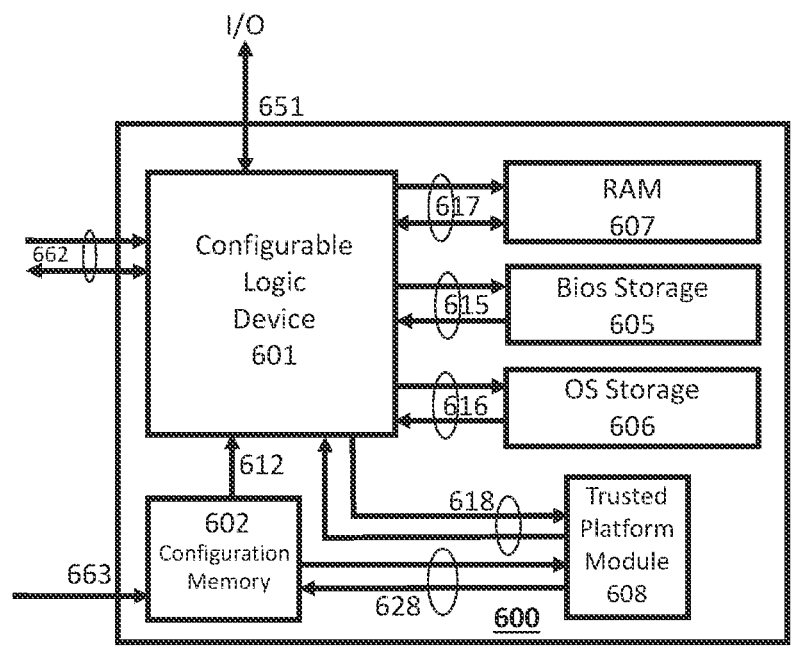
FIG. 6A illustrates an expandable SE-SiP sub-module according to embodiments of the present disclosure.

FIG. 6A depicts a sub-module 600 similar to the module 500 shown in FIG. 5A according to some embodiments. In the sub-module 600, a TPM 608 (or other trust component) is included in each module.

Figure 6B:
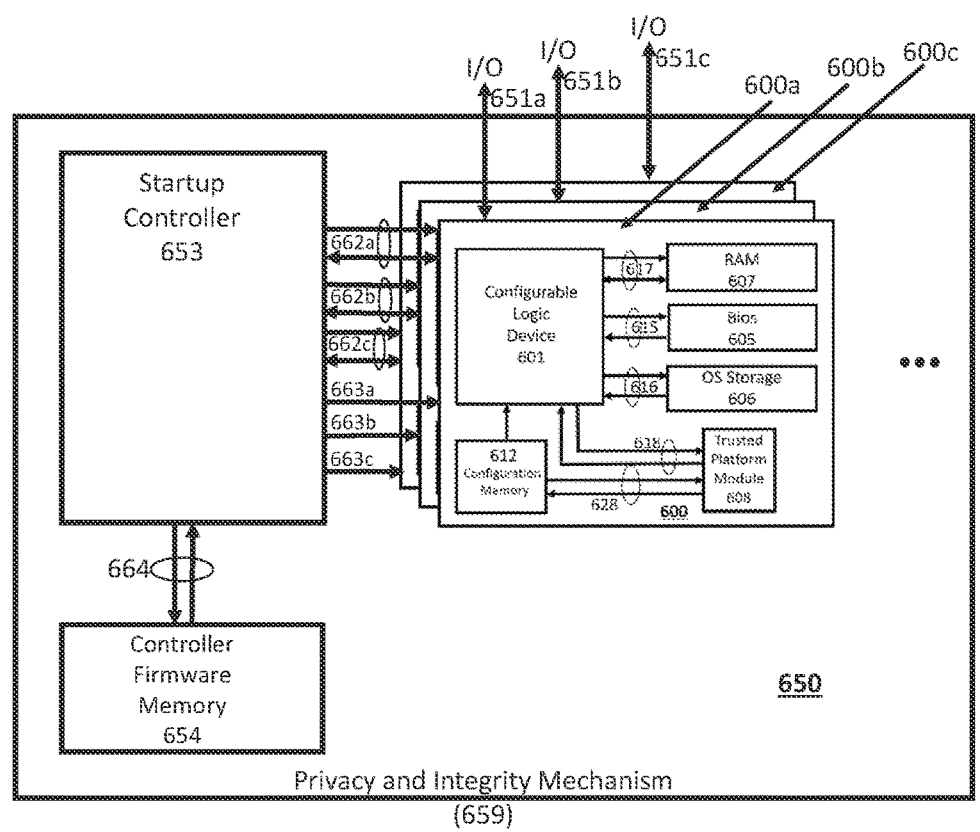
FIGS. 6B and 6C illustrate aspects of an expandable SE-SiPs using the expandable SE-SiP sub module depicted in FIG. 6A, according to embodiments of the present disclosure.
Figure 6C:
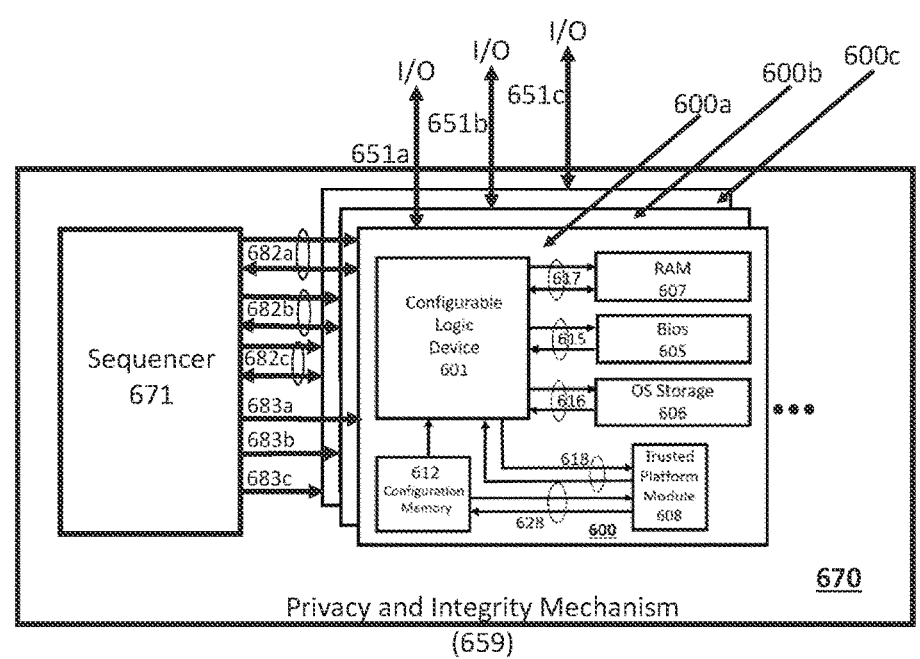

FIGS. 6B and 6C depict systems 650 and 670 according to some embodiments. Each of the systems 650 and 670 may be a SE-SiP comprising a plurality of sub-modules 600a-c. In the systems 650 and 670, a TPM 608 is included in each of the sub-modules 600a-c. Unlike the system 550 shown in FIG. 5B (in which all of the sub-modules share a single TPM), in the systems 650 and 670, each sub-module has a dedicated TPM 608. Depending on the configuration desired for a specific application, the individual type of sub-modules depicted in FIG. 4 (400), FIG. 5A (500), and FIG. 6A (600) may be used in any combination with each other in a specific SE-SiP. That is, a SE-SiP may use different types of sub-modules, where each sub-module may have varying degrees of integration of storage, trust component, and/or configuration memory.

FIG. 6B depicts a system 650 according to some embodiments. The system 650 may be a SE-SiP comprising multiple (in this example three) sub-modules 600a-c. Each sub-module 600a, b, and c is connected to the startup controller 653 through buses 662a-c and 663a-c. They may also be connected externally using I/O ports 651a-c. The I/O ports 651a-c may be separate or may be combined by means of wired or multiplexing or some other scheme into a single bus. The sub-modules 600 when configured in the SE-SiP 650 may be connected as shown in this example, or only one I/O may be implemented with the other sub-modules remaining internally connected to the one which is externally connected. The same scheme may be the case with the connections to the startup controller via the buses 662 and 663. Although not shown, the sub-modules may be interconnected in various combinations, in addition to the mix and match combinations of using the sub-modules previously described for sub-modules 400, 500 and 600. As in FIGS. 2, 4 and 5, the PIM 659 physically protects the packaged SE-SiP according to some embodiments.

FIG. 6C depicts an embodiment for an expanded performance SE-SiP 670 similar to that depicted in FIG. 4, 5B and 6B. In the embodiment shown in FIG. 6C, a sequencer 671 replaces the startup controller 653 shown in FIG. 6B. In certain aspects, the sequencer (initializer) 671 provides the basic functions of the startup controller 653 shown in FIG. 6B. According to embodiments, the tasks of the startup controller can vary in complexity depending on the architecture of the SE-SiP. FIGS. 2, 4, 5B, 6B and 6C depict, for example, the possible breadth of a SE-SiP architecture. The complexity of the startup controller will depend on how extensive or simple the architecture is. As in FIGS. 2, 4 and 5, the PIM 659 physically protects the SE-SiP according to some embodiments.

Figure 7:
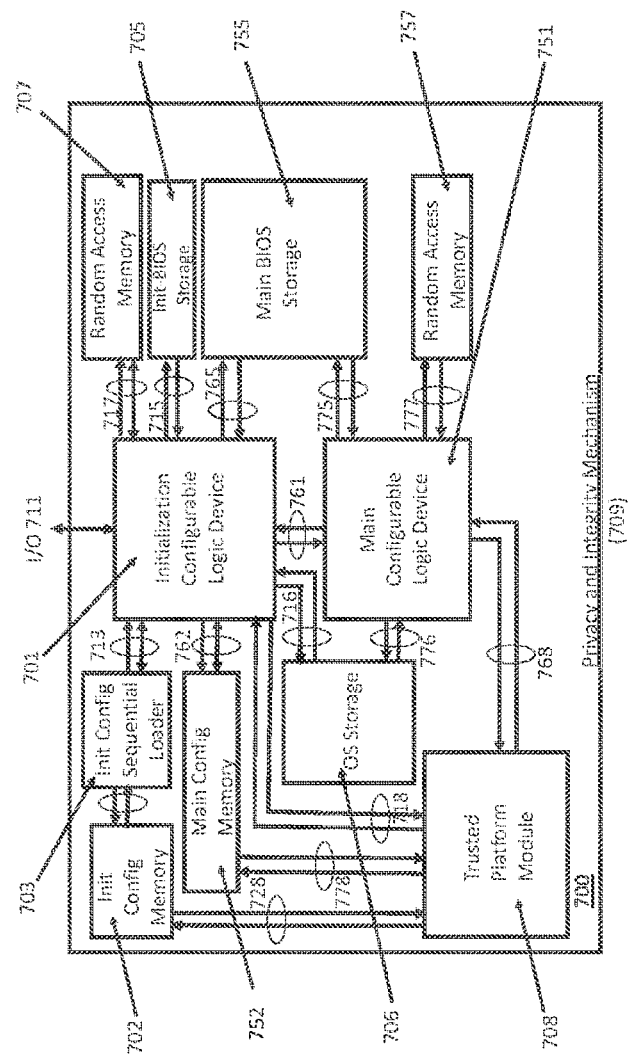
FIG. 7 illustrates aspects of a remotely configurable secure enclave SiP according to embodiments of the present disclosure.

Referring now to FIG. 7, a remotely configurable Secure Enclave System in Package (SE-SiP) 700 is provided according to some embodiments. As in FIG. 6C, the SE-SiP comprises a Sequential Loader 703 which contains and executes the power up sequence for the SE-SiP when powered up or reset (see for example, but not limited to step 301 of FIG. 3), which can include using the initial configuration memory 702 to configure the initial CLD (ICLD) 701. In this example, the SE-SiP contains two Configuration Memories 702 and 752 corresponding to two CLDs, the initial CLD 701 and the main CLD 751. Likewise, there are two BIOS Storage areas 705 and 755 and two RAMS 707 and 757. The example SE-SiP of FIG. 7 also contains a single OS Storage 706 and a single TPM 708. Once operational, the SE-SiP may also use the RAM 707 in addition to the RAM 757. The SE-SiP 700, once operational, may also re-configure the ICLD 701 to perform additional functions associated with PIM control.

For the SE-SiP 700, the Init Config Memory 702 and the Init-BIOS storage 705 may be pre-programmed at the factory to provide minimal functionality after a TPM verified power up sequence. Specifically, the SE-SiP is capable of use of the TPM 708 to verify the contents of 702 and 705. After the Init CLD 701 completes its configuration, the SE-SiP 700 may fetch via I/O 711 and store user-communicated data for the Main CLD Config Memory 752, the user-supplied data for the Main BIOS Storage 755, and/or the user-supplied data for the OS Storage 706. The Init Config Memory 702 and Init Config Sequential Loader 703 can further configure Init CLD 701 to act as the configuration loader for the Main CLD 751. Once verified and functional, the system continues to communicate with the outside world through its I/O port 711. As in FIGS. 2, 4 and 5, the PIM 709 physically protects the SE-SiP according to embodiments.

According to embodiments, configuration design enhancements allow the user to determine the main CPU design by specifying the Main Config Memory 752 of the Main CLD 751, as well as to determine the Main BIOS Storage 755 and the OS Storage 708.

The functions of the ICLD 701 and its support devices may also be performed by a hard-wired microcontroller. However the embodiment depicted using the ICLD 701 may be more trustworthy for certain applications due to its simplicity and transparency, and the fact that the TPM 708 may be used to verify the integrity of the Init Config Memory 702 and the Init BIOS Storage 705 during initialization. Once initialized, the TPM can be used in its normal fashion for verifying user-supplied data.

In some embodiments, the TPM 708 may also be used by the Main CLD 751 to verify the contents of the Main Config Memory 752, the Main BIOS Storage 755, and the OS Storage 706.

In certain aspects, communication paths 728 and 778 represent paths by which the CLDs 701 and 751 respectively may use the TPM 708 to verify the contents of Init Config Memory 702 and main Config Memory 752, respectively, in case the configured ICLD 701 does not yet have read access to configuration memories. These may physically be implemented as separate paths from Init Config Memory 702 to Init CLD 701 and from Main Config Memory 752 to Main CLD 751 to allow the CLDs to control and read their Config Memories.

According to embodiments, both the Init. CLD 701 and the Main CLD 751 have their resources of BIOS (715 and 765 respectively), Random Access Memory (707 and 757 respectively) and a common OS storage 706. Each of the resources (BIOS, RAM and OS storage) may be combined into one entity such as one BIOS resource used by both the Init. CLD 701 and the Main CLD 751. Also a shared resource such as the OS storage 706 may be split such that the Init. CLD 701 and Main CLD 751 have an individual OS storage resource (not shown in FIG. 7).

Figure 8A:
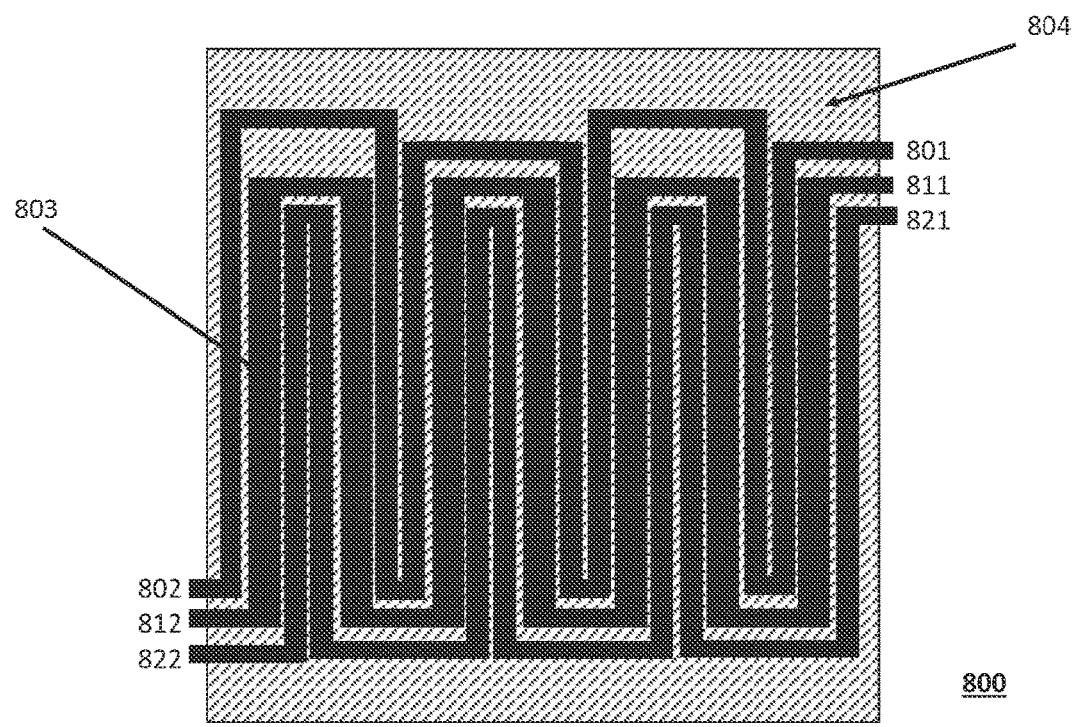
FIGS. 8A and 8B illustrate security fabrics according to embodiments of the present disclosure.
Figure 8B:
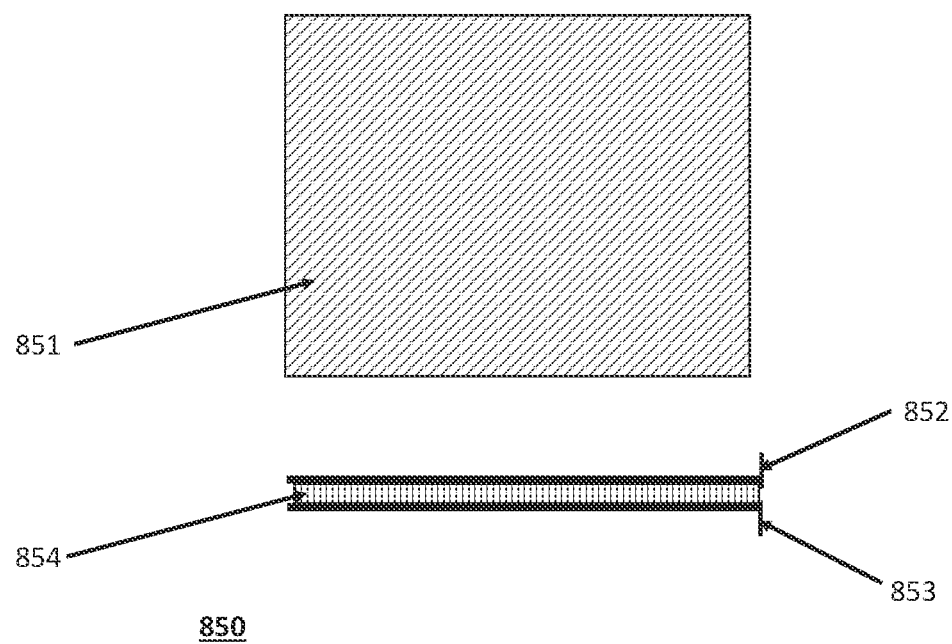

Referring now to FIGS. 8A and 8B, hardware structures and devices 800 are depicted for detecting an attempt to physically access or tamper with a SiP according to some embodiment. Such structures and devices may be used in connection with a device as shown in any of FIGS. 1, 2, and 4-7 according to embodiments. They may be monitored, for instance, by one or more of the programmable hardware device(s) and startup components. Similarly, such components may initiate a response if an access is attempted.

As shown in FIG. 8A, one embodiment uses the electrical properties of a serpentine group 803 of electrical conductors 801/802, 811/812, 821/822 as a sensor to detect an attempt to physically tamper with the SiP. These three electrical conductors form a circuit with a set of measurable resistances, capacitances and inductances. For full coverage, these types of conductors may be positioned to cover all of the six surfaces of a SE-SiP of the present disclosure. Measured parameters may include, for example, resistances $R_1$-$R_3$, mutual and self-inductance, and capacitance. While three is used as an example, other numbers of electrical conductors may be used. In embodiments, the number of electrical conductors may be as few as one and as many as required to protect the SE-SiP. Factors influencing the number of conductors are, but not limited to, the size of the SE-SiP, the level of security expected, and the detection algorithms used. This applies to not only how many conductors are used in the intrusion sensor, but also to the number of intrusion sensors included in the PIM.

In addition to the measurable resistances, capacitances and inductances, other measurable combinations based on the LRC interactions can detect not only the physical handling but the close proximity of a foreign body. For example, by observing the frequency of the tuned circuit constructed by such an array of conductors, any interference by close proximity movement could be detected by the change in the frequency (Q) of the circuit. Once detected, various actions may be executed to protect the SiP by additional circuitry in the SiP. According to embodiments, one or more electrodes may be copper conductors, for instance, embedded in the package 804 and/or PIM, or similar encapsulant.

FIG. 8B depicts an alternative hardware embodiment 850 used for detecting an attempt to access or tamper with a SiP (e.g., as illustrated with respect to any of FIGS. 1, 2, and 4-7). In this example a porous capacitance material 851 is used to create two plates of a capacitor 852 and 853 where the SiP 854 can act as the dielectric of the capacitor. The SiP 854 may be any of the embodiments described earlier herein. This configuration will act similarly to that of a touch screen on a smart phone. Capacitive changes due to the proximity or touching of a foreign object will alter the value of the capacitor comprising the two plates of porous capacitance material 851 and two plates 852, 853. For example, by observing the frequency of the tuned circuit constructed by such an array of conductors, any interference by close proximity movement may be detected by the change in the frequency (Q) of the circuit. Once detected, various actions may be executed to protect the SiP by additional circuitry in the SiP. The hardware embodiment 850 may be encapsulated as part of a product as depicted in FIG. 9C.

Figure 9A:
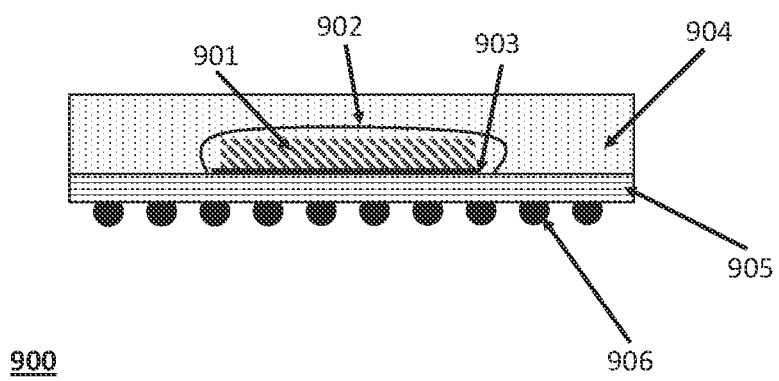
FIGS. 9A, 9B and 9C illustrate capacitive security fabrics according to embodiments of the present disclosure.
Figure 9B:
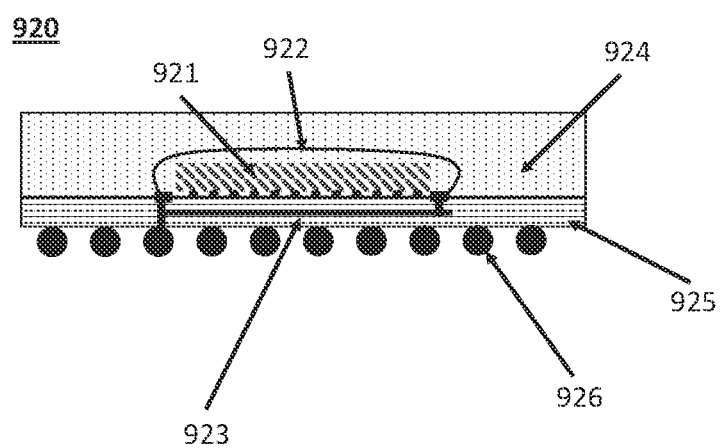
Figure 9C:
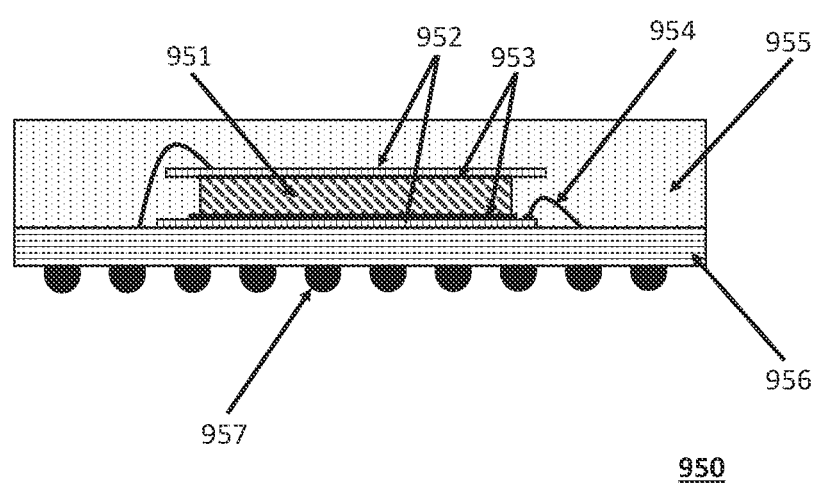

FIGS. 9A, 9B and 9C depict exemplary cross-sectional views of hardware embodiments for creating a capacitance fabric in a SiP 900 (shown in FIG. 9A), 920 (shown in FIG. 9B), and/or 950 (shown in FIG. 9C). Again, the SiP (or SE-SiP) may be any of the embodiments described earlier herein.

FIG. 9A depicts a fabric attached to a substrate 905 with encapsulant 904. The fabric comprises two plates of a capacitor 902 and 903 with the SiP 901 acting as the dielectric. One of the plates comprises a conductive layer between the SiP 901 and the substrate 905. The second plate is created using a mesh of bond wires 902 attached from side to side of the SiP 901. Although not depicted, bond wires may be erected in both the X and Y directions. Or they may be erected between adjacent sides of the SiP. In addition, the bond wires may be erected in such a way to weave a fabric with a variety of patterns. Note that the SiP 901 may be attached to another SiP substrate 905 as a component connected with other circuits on it. Further, multiple SiPs may be attached to a SiP substrate 905. In some instances, the SiP 901 may not be a fully packaged SiP but may instead depend on the encapsulant 904 of the complete SiP 900 for its packaging. In some embodiments the SiP 901 may be attached to a PCB rather than another SiP substrate 905 (not shown).

FIG. 9B depicts a detection fabric attached to a substrate 925 and disposed within encapsulant 924, according to some embodiments. In this example, the fabric comprises two plates of a capacitor 922 and 923 with the SiP 921 acting as the dielectric. One of the plates comprises a conductive layer between the SiP 921 and the substrate 925. The second plate is created by creating a mesh of bond wires 922 attached from side to side of the SiP 921. Although not shown, it may be understood that the bond wires 922 may be erected in both the X and Y directions. Or they may be erected between adjacent sides of the SiP. In addition, the bond wires may be erected in such a way to weave a fabric with a variety of patterns. Note that the SiP 921 may be attached to another SiP substrate 925 as a component connected with other circuits on it. Further, multiple SiPs may be attached to the SiP substrate 925. In some instances, the SiP 921 may not be encapsulated on the SiP substrate 925 but may be stand alone in a system (not shown). In some embodiments the SiP 921 may be attached to a PCB rather than another SiP substrate 925 (not shown).

FIG. 9C depicts an alternative detection configuration where both plates 952 of the capacitor (refer to FIG. 8B) are attached to the SiP 951 using an adhesive 953. Each of the plates may be connected to the substrate 956 with bond wires 956. Note that the SiP 951, either encapsulated or not encapsulated, may be attached to another SiP substrate 956, as a component connected with other components or circuits on it. Further, multiple SiPs may be attached to the SiP substrate 956. FIG. 9C shows that the SiP 951 is disclosed within encapsulant 955. However, in some other embodiments, the SiP 951 may not be encapsulated on a SiP substrate 956 but may be stand alone in a system (not shown). In some embodiments the SiP 951 may be attached to a PCB rather than another SiP substrate 956 (not shown).

Figure 10A:
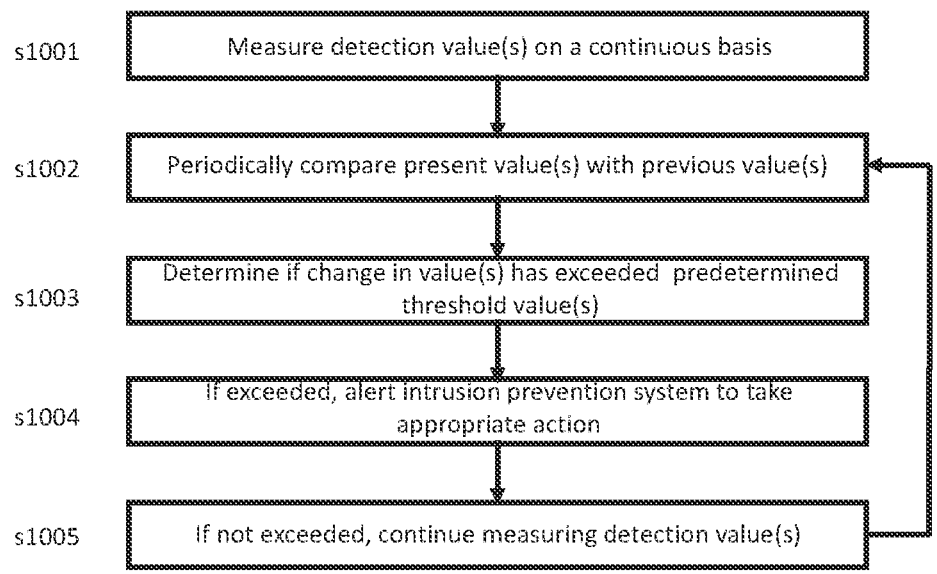
FIG. 10A depicts a method for detecting intrusions according to embodiments of the present disclosure.

FIG. 10A depicts a method 1000 for detecting an intrusion of a packaged SE-SiP of the present disclosure, or a SiP using the configurations depicted in FIGS. 8 and 9, or similar to or equivalent to these configurations. The method may be initiated by measuring in step s1001 preselected electrical values used for detection purposes on a continuous basis (e.g., capacitance, inductance, frequency). On a periodic basis, the present values are compared in step s1002 with previous values. While periodic measurement/comparison is used in this example, the measurements/comparisons may be semi-periodic and/or in response to a trigger. According to embodiments, the previous values may be averaged or mathematically combined. If a change in the value (i.e., the difference between the present value and the previous value(s)) has exceeded a predetermined threshold (step s1003), appropriate action is taken in step s1004. If the threshold has not been exceeded, the detected values are continued to be measured in step s1005 and compared.

FIG. 10B depicts possible actions to be taken according to embodiments by a SiP, whether or not a SE-SiP, to protect itself from any type of intrusions. Such intrusions may occur when the SiP is either in the powered off state 1041 or in the powered on state 1043. When the SiP is in the powered off state 1041 (i.e., powered down) certain passive actions (e.g., a first passive action 1051) may be taken to protect itself, such as, for example, but not limited to, incorporating a protective shield (209) to prevent an intruder from evaluating the SiP circuits and contents such as, for example, but not limited to, stored data using external observation methods. When the SiP is in the powered off state 1041 (i.e., in a low powered state) but still in an active state 1044, actions it may take to protect itself, such as, for example, but are not limited to, erase all non-volatile memory, or self-destructing. When the SiP is in the powered on state 1043 (i.e., functioning normally), passive actions 1042 to protect itself may include, such as, for example, but are not limited to, using a protective shield (209) to prevent data or configuration information from radiating from the SiP and being captured by an intruder. When the SiP is in the powered on state 1043, it may take actions such as, but not limited to, turn itself off, to erase volatile memory, to erase both volatile and non-volatile memory, implement active data leakage countermeasures, or self-destruct 1054.

Figure 10C:
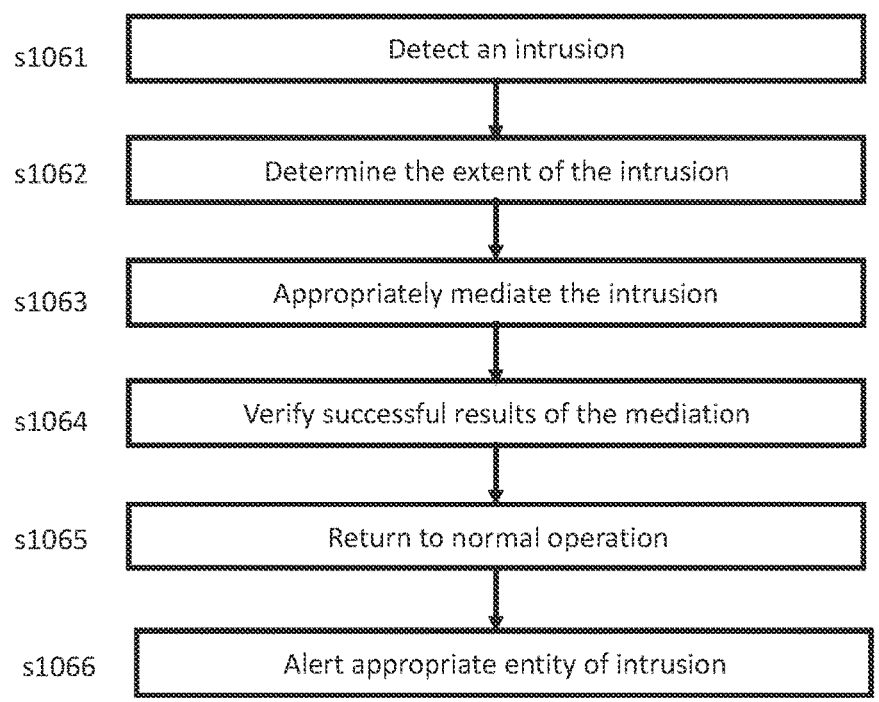

FIG. 10C depicts a method 1060 for a SiP to protect itself from an intrusion. Once an intrusion is detected in step s1061 (see for example, but not limited to step s1004 of FIG. 10A) a determination is made in step s1062 as to the extent of the intrusion. Once the determination is made, appropriate action is taken in step s1063 to mediate the intrusion. After successful results of the mediation have been verified in step s1064, the SiP returns to normal operation in step s1065 and alerts in step s1066 an appropriate external entity of the intrusion. The "extent" may be, but is not limited to, someone or something nearing the SE-SiP, the SE-SiP in motion, the SE-SiP being imaged, the SI-SiP being disassembled, and/or the SE-SiP being destroyed. Although the SiP may return to normal operation, the SiP may also notify an appropriate external entity of the intrusion.

Figure 11:
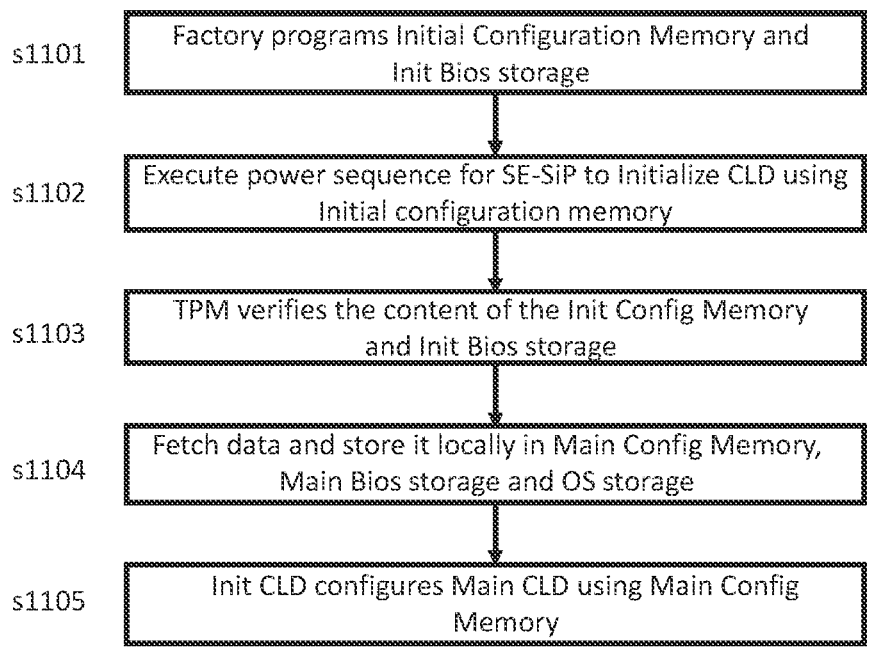
FIG. 11 depicts a method for remotely configuring a SE-SiP according to embodiments of the present disclosure.

FIG. 11 depicts a method for programming a remotely configurable SE-SiP, like that of FIG. 7. In this instance, the memory 702 and the storage 705 are pre-programmed in step s1101 at a factory or assembly plant assembling the SE-SiP to provide minimal functionality after the power up sequence executed in step s1102 (see FIG. 3). Specifically, the SE-SiP uses the TPM to verify in step s1103 the contents of the memory 702 and the storage 705. A remotely configurable SE-SiP is also capable of remote communication to fetch and store data locally (in step s1104), and to use that data to further configure the SE-SiP. Specifically, after the Init CLD 701 completes its configuration in steps s1103 and s1104, the init CLD configures the main CLD s1105, it can fetch and store the user-supplied data for the Main CLD Config Memory 752, the user-supplied data for the Main BIOS Storage 755, and the user-supplied data for the OS Storage 706. The Init Config Memory 702 and Init Config Sequential Loader 703 further configure Init CLD 701 to act as the configuration loader for the Main CLD 751. The processor implemented on the Init CLD 701 based on the Init Config Memory 702, once operational, may receive instructions and data through the I/O 711 to store the implementation data in the Main Config Memory 752 to implement further functions, such as a processor or peripheral device on the Main CLD 751. According to embodiments, this process will occur each time the processor implemented on the Init CLD receives data and instruction to re-configure the Main CLD.

Figure 12A:
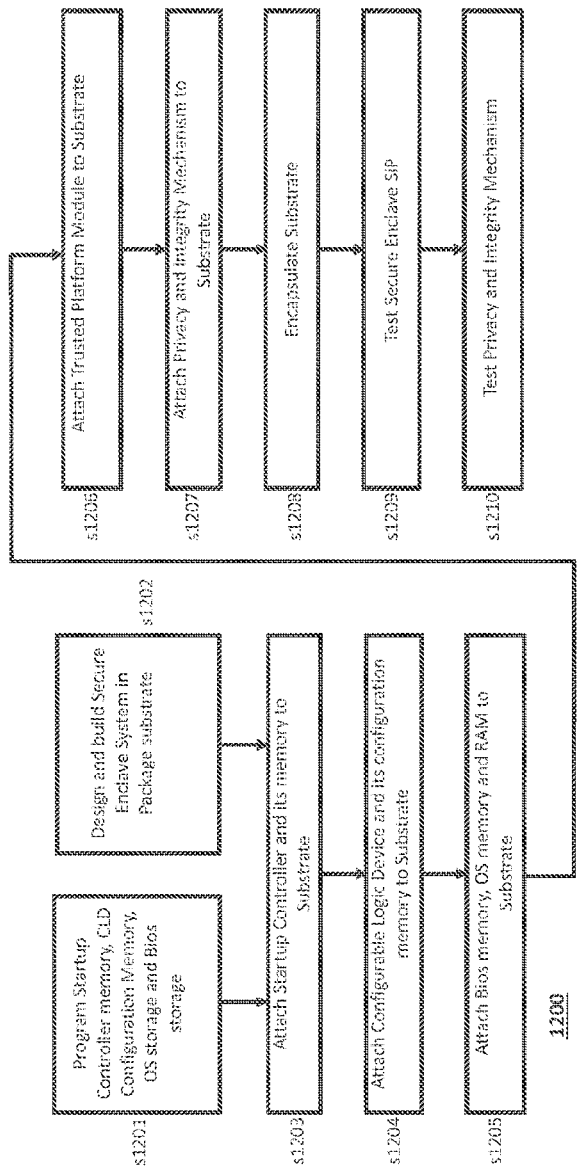
FIGS. 12A and 12B depict methods for constructing Secure Enclave System in Package (SE-SiPs) devices according to embodiments of the present disclosure.
Figure 12B:
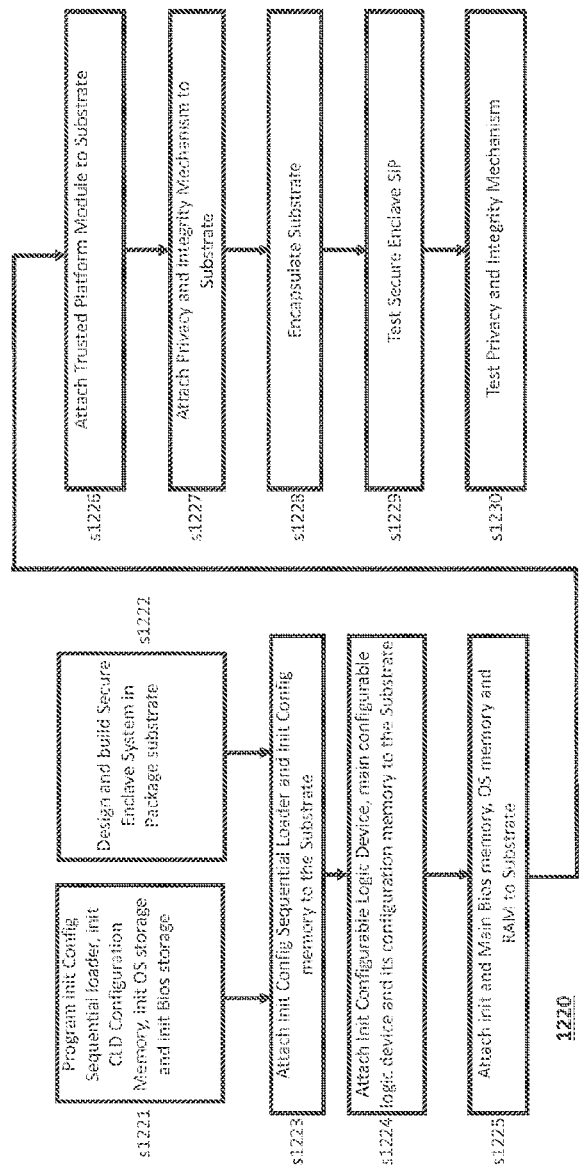

FIGS. 12A and 12B depict methods for constructing Secure Enclave System in Package (SE-SiPs) devices according to some embodiments.

Referring now to FIG. 12A, a process 1200 is depicted for constructing a SE-SiP (see FIGS. 2A-2D) that is completely programmed during the construction process and ready to be deployed. The first two steps of the process 1200 (steps s1201 and s1202) are done independently of each other in some embodiments. The memories 202 and 204, and storages 205 and 206 are programmed in step s1201. Independently, the SE-SiP substrate is designed and built in step s1202. Once these two steps are completed, the SE-SiP is ready to be populated. Steps s1203 through s1207 populate the substrate. The steps to populate the substrate may comprise attaching the controller 203 and the memory to the substrate (step s1203), attaching the device 201 and the memory 202 to the substrate (step s1204), attaching memories 205-207 to the substrate (step s1205), attaching the TPM to the substrate (step s1206), and/or attaching the PIM 209 to the substrate (step s127). These steps may occur in any sequence depending on the best practice of the manufacturing line. After all of the components are attached, including any additional active and associated passive components, the SE-SiP is encapsulated in step s1208. Finally, in steps s1209 and s1210, the SE-SiP is tested. The tests may include testing both the SE-SiP functionality and the PIM.

Referring now to FIG. 12B, process 1220 is depicted for constructing a SE-SiP that can be further programmed once deployed (see, e.g., FIGS. 7 and 11). As in FIG. 12A, the first two steps of the process (s1221 and s1222) can be done independently of each other. The loader 703, the memory 702, and the storages 705 and 706 are programmed in step s1221. Independently, the SE-SiP substrate is designed and built in step s1222. Once these two actions are completed, the SE-SiP is ready to be populated. Steps s1223 through s1227 populate the substrate. The steps to populate the substrate comprise attaching the loader 703 and the memory 702 to the substrate (step s1223), attaching the device 701, the device 751, and the memory 752 to the substrate (step s1224), attaching memories 705, 755, 706, and RAM 707 and 757 to the substrate (step s1225), attaching the TPM 708 to the substrate (step s1226), and/or attaching the PIM 709 to the substrate (step s1227). These steps may occur in any sequence depending on the best practice of the manufacturing line. After all of the components are attached, including the associated active and passive components, the SE-SiP may be encapsulated in step s1228. Finally the SE-SiP is tested in steps s1229 and s1230. The tests include testing the SE-SiP functionality (step s1229) and the Privacy and Integrity Mechanism (step s1230).

In some embodiments, each level of integration could have its own PIM. That is, a PIM within a PIM within a PIM, etc. Additionally, embodiments provide for a SE-SiP within an SE-SiP on a PCB.

Some exemplary embodiments may include, for instance, one or more of the following:

A packaged Secure Enclave System in a Package (SE-SiP), comprising: a substrate containing a plurality of operatively interconnected components and devices, comprising, an initializer, at least one CLD configurable to be an executable device, and a root of trust. In may further comprise structures, components and devices associated with said package for detecting and preventing tampering of and physical access to the Se-SiP components.

In may further include a memory, such as a read only memory, or a RAM. One or more of read only memories contains instructions for configuring a CLD into a selected/limited function CPU. In some instances, one of said at least one read only memory further contains BIOS instructions for said configured CPU.

In some embodiments, a root of trust component verifies said instructions for configuring said CLD into a limited function CPU. In some embodiments, the root of trust component verifies at least one of said BIOS and said OS.

The device may comprise an input and output communications port controlled by a CLD for securely receiving and sending signals.

The device may comprise a PMIC and one or more of components and devices for power storage, sensing, measuring and wired and/or wireless communications.

According to embodiments, a configurable logic device module is provided, comprising: at least one CLD, an initializer, a root of trust, and a substrate on which said CLD, initializer, and root of trust are mounted and operatively interconnected.

According to embodiments, a Secure Enclave System in a Package (SE-SiP) is provided, comprising: a substrate containing a plurality of operatively interconnected components and devices, comprising, a startup controller, a CLD, and a TPM component.

According to embodiments, a packaged Secure Enclave System in a Package (SE-SiP) is provided, comprising: a substrate containing a plurality of operatively interconnected components and devices, comprising, a startup controller, one or more CLDs, and one or more TPM components.

According to embodiments, a packaged SiP is provided, comprising: a substrate containing a plurality of operatively interconnected components and devices, comprising, a Secure Enclave System (SE-SiP), comprising, a substrate containing a plurality of operatively interconnected components and devices, comprising, a startup controller, one or more CLDs, and one or more TPM components corresponding to said one or more CLDs, and structures, components and devices associated with said SiP package for detecting and preventing tampering of and physical access to the Se-SiP components.

According to embodiments, a device is provided that comprises: a start-up controller programmed using an internal controller, a firmware memory to configure the SE-SiP, a CLD configurable to be an executable device, a pre-programmed read only memory containing the CLD configuration, a pre-programmed read only memory containing a BIOS and an operating system for the CLD, a random access memory controlled by the CLD, a TPM, an input and output communications port controlled by the CLD, and a package containing components and devices for detecting and protecting against intrusion.

According to embodiments, a method is provided for creating a preprogrammed Secured Enclave System in Package prior to deployment comprising: assembling on a SiP substrate having one or more connection layers appropriately interconnected: (i) a sequencing device (671) preprogrammed to configure the SE-SiP when powered up or reset, (ii) a Trusted Processor (2001) comprising a Configurable Logic Device (201) and its preprogrammed configuration memory (202), (iii) a preprogrammed Bios storage device (205), (iv) a preprogrammed OS storage device (206), (v) a Random Access Memory device (207), (vi) a Trusted Platform Module (208), and/or (vii) physically secured with a Privacy and Integrity Mechanism (209).

According to embodiments, a method for creating a Secured Enclave using a System in Package (230) comprises: applying power to the SE-SiP; once the sequencer (203/204) is powered it initiates the process to configure the CLD (201) using the configuration stored in the Configuration Memory (202); once the CLD is configured to be a trusted processor (2001), it boots using the Bios stored in the Bios Storage device (205); once booted, the trusted processor begins operation using the Operating System (OS) stored in the OS storage device (206), the Random Access memory (207) and TPM (208).

According to embodiments, a method comprises: once the SE-SiP is functional based on above method, the Trusted Processor (2001) further configures itself by receiving CLD configuration data from a trusted source and verified by the TPM (208); and configuring a portion of the un-configured CLD using the received configuration data to extend the functionality of the SE-SiP.

According to embodiments, a method for securely performing a plurality of functions and operations using a programmable processor, comprises: verifying instructions for organizing a plurality of programmable logic elements into said programmable processor; organizing said plurality of programmable logic elements into said programmable processor using said verified instructions; verifying a set of BIOS instructions for use in said programmable processor; verifying a set of OS instructions for use in programmable processor; loading said set of BIOS instructions for use in said programmable processor in a first portion of said programmable processor; loading said set of OS instructions for use in said programmable processor in a second portion of said programmable processor; executing portions of said set of BIOS instructions and said set of OS instructions in said programmable processor; and performing said plurality of functions and operations using said programmable processor.

According to embodiments, a PIM may be part of the packaging, for instance, as part of the packaging of a SE-SiP. However, in some embodiments, a PIM may be external.

According to embodiments, a trust component verifies the executables and configurations, for instance, of the controller firmware memory and the configuration memory. This may be prior to programming of a programmable hardware device or the overall device (e.g., SE-SiP) going operational. Where it is not verified prior to operation, and according to some embodiments, the device will shut down if the verification fails. As an example, a SE-SiP may be properly initialized and running, receive new code that is not verifiable/correct, and then shut down based on the received code (or other input).

According to embodiments, a SiP is provided that includes the startup component(s), programmable hardware device(s), and trust component. In some instances, however, these components may be bare (unpackaged) and mounted on a board/substrate, and then incorporated into a large package. That is, the "secure apparatus" may be a sub-part (e.g., component) of a larger system, that is separately packaged, thereby preventing access to the secure components. In certain aspects, PIM may be part of that larger system. Some embodiments may include a system with secure components, a system with a secure SiP, and a SiP within a SiP. One or more PIN/Is may be integrated (or omitted) at each level.

Summary of Embodiments

In one aspect, an apparatus is provided. The apparatus may comprise at least one startup component (e.g., startup controller, initializer, sequencer, microprocessor, or microcontroller), at least one programmable hardware device (e.g., a trusted processor, analog processor, digital processor, mixed-signal device, microprocessor, optical device, programmable hardware device, or configurable logic device (CLD), FPGA(s)), and a trust component (e.g., a trusted platform module (TPM) or root of trust component). The startup component, programmable hardware device, and trust component are packaged together to form a System-in-Package (SiP) device.

The SiP device may be a Secure Enclave (SE) SiP.

The apparatus may further comprise a privacy and integrity mechanism (PIM), wherein the startup component, programmable hardware device, and trust component are packaged (e.g., contained and/or protected) within the PIM.

The apparatus may further comprise at least one SiP substrate. The startup component, programmable hardware device, and trust component may be mounted on the at least one SiP substrate and operatively interconnected using one or more connections of the at least one SiP substrate.

The SiP device may have only one input/output (I/O) port.

The I/O port may be connected to the programmable hardware device.

The startup component may be adapted to configure the programmable hardware device at every power-up or reset of the apparatus (e.g., executes a power-up or reset sequence stored in the startup component or associated memory).

The trust component may be adapted to monitor and verify the initialization/setup of the programmable hardware device at each startup or reset, and/or monitor communications on the I/O port.

The apparatus may further comprise any one or more of the followings: a controller firmware memory (e.g., containing an executable for the startup component) in communication with the startup component; a configuration memory (e.g. configurations for the programmable hardware device), wherein the configuration memory is adapted to receive signals from the startup component, send signals to the programmable hardware device, and is in communication with the trust component (e.g., the trust component verifies the executables and configurations of the controller firmware memory and the configuration memory); a random access memory (RAM) element in communication with the programmable hardware device; a BIOS storage element in communication with the programmable hardware device (e.g., containing initialization instructions for the processor of the programmable hardware device); and an operating system (OS) storage element (e.g., the operating system for the processor of the programmable hardware device).

The programmable hardware device may comprise a plurality of logic devices (e.g., a plurality of CLDs or FPGAs).

Each of the plurality of CLDs may share a common RAM, BIOS storage, OS storage, and/or configuration memory.

Each of the plurality of CLDs may be in communication with the trust component (e.g., the trust component is a shared trust component, such as a shared TPM), and/or in communication with the startup component (e.g., the startup component is a shared startup component, such as a shared startup controller).

Each of the plurality of logic devices (e.g., CLDs or FPGAs) may have one or more of its own dedicated RAM, BIOS storage, OS storage, and/or configuration memory.

Each of the plurality of CLDs may be in communication with the trust component (e.g., the trust component is a shared trust component, such as a shared TPM), and/or is in communication with the startup component (e.g., the startup component is a shared startup component, such as a shared startup controller).

Each of the plurality of logic devices (e.g., CLDs or FPGAs) may have its own dedicated trust component (e.g., TPM).

Each of the plurality of CLDs is in communication with the startup component (e.g., the startup component is a shared startup component, such as a shared startup controller having a controller firmware memory, or a sequencer).

The apparatus may be configured such that each of the plurality of logic devices (e.g., CLDs or FPGAs) is independently verified (e.g., by a shared or dedicated TPM) prior to a communication via the I/O (e.g., a first communication, inbound or outbound).

The programmable hardware device may comprise an initialization configurable logic device and a main configurable logic device, wherein at least the main configurable logic device is in communication with the trust component.

The apparatus may be remotely configurable.

The apparatus may comprise one or more of: an initial configuration sequential loader (e.g., which contains and executes the power up sequence for the SE-SiP when powered up or reset) in communication with the initialization configuration logic device; an initial configuration memory (e.g. with initial configurations for the programmable hardware device) in communication with the trust component and the initial configuration sequential loader (e.g., the trust component verifies the executables and configurations of the memory); a main configuration memory (e.g. with the main configurations for the programmable hardware device) in communication with the trust component and the initialization configurable logic device (e.g., the trust component verifies the executables and configurations of the memory); OS storage in communication with the initialization configurable logic device and the main configurable logic device; RAM in communication with the main configurable logic device; main BIOS storage in communication with both of the initialization configurable logic device and the main configurable logic device; RAM in communication with the initialization configurable logic device; and initialization BIOS storage in communication with the initialization configurable logic device.

The PIM may comprise a plurality of serpentine electrodes (e.g., 3).

At least one programmable hardware device (e.g., a dedicated CLD or FPGA) or a startup component may be configured to measure one or more of resistance, capacitance, inductance, and frequency using the serpentine electrode to detect an attempted access (e.g. a physical access and/or an electrical access) of the apparatus.

The PIM may comprise a two-plate capacitive arrangement.

At least one plate of the capacitive arrangement may comprise a porous plate (e.g., a capacitance fabric).

At least one plate of the capacitive arrangement may comprise a plurality of bond wires (e.g., overlapped or woven).

One or more packaged electrical components (e.g., one or more of the startup component, hardware device, and trust component) may comprise the dielectric between the two plates in the capacitive arrangement.

At least one programmable hardware device (e.g., a dedicated CLD or FPGA) or a startup component may be configured to measure one or more of resistance, capacitance, inductance, and frequency using the capacitive arrangement to detect an attempted access (e.g. a physical access and/or an electrical access) of the apparatus.

The PIM may include a protective shield to prevent one or more of external observation and emission of radiation, and/or to provide heat management.

The apparatus may be packaged within another SiP (e.g., a SiP-in-SiP) or at least one of the startup components, programmable hardware devices, and trust components may be a packaged SiP (e.g., a SiP-in-SiP or SiP-in-SiP-in-SiP, or as one component in a larger system).

The apparatus may further comprise a second PIM (e.g., as part of a larger SiP containing the apparatus and optionally first PIM).

In some embodiments, a method for using and/or configuring the apparatus described above is provided. The method may comprise performing a power-up or reset; configuring one or more programmable hardware devices using the startup component in response to the power-up or reset; performing one or more verification operations using the trust component; and performing one or more input output operations after a successful verification operation.

In some embodiments, a method for assembling the apparatus described above is provided. The method may comprise mounting and interconnecting the startup component, programmable hardware device, and trust component on a SiP substrate; and packaging the components to form an SE-SiP.

The method may further comprise including a PIM structure as part of the package of the SE-SiP.

The method may further comprise including one or more electronic components (e.g., power management, energy storage, sensors, actuators, wired or wireless communication devices, etc.).

In some embodiments, a method is provided. The method may comprise performing a power-up or reset operation; initializing a startup controller, preparing configuration data (e.g., by a startup controller in a configuration memory, using code in a controller firmware memory); configuring a device, such as a CLD or FGPA (e.g., using the configuration data); executing first instructions (e.g., the CLD or FPGA begins executing instructions); receiving second code; performing code verification on the second code; and executing second instructions based on the received second code (e.g., the CLD or FPGA begins operation).

The method may be performed by an SE-SiP.

In some embodiments, a SiP device is provided. The SiP device may comprise one or more electronic components (e.g., power management, energy storage, sensors, actuators, wired or wireless communication devices, etc.); and a privacy and integrity mechanism (PIM) protecting one or more of the electronic components.

The PIM may comprise one or more of (i) a plurality of serpentine electrodes, (2) a capacitive mesh fabric, and (3) a two-plate capacitive arrangement, wherein at least one of the electronic components is located within a dielectric region associated with the two-plate capacitive arrangement.

At least one of the electronic components may be configured to monitor PIM and respond to an attempted access.

In some embodiments, a detection method is provided. The detection method may comprise measuring one or more detection values (e.g., capacitance, inductance, resistance, frequency, temperature); comparing a present value with one or more previous values; and determining that a threshold has been exceeded, and in response, performing an intrusion response action.

The one or more previous values may comprise an average value of prior measurements.

The intrusion response action may comprise alerting an intrusion prevention system.

The intrusion response action may comprise one or more of: erasing all non-volatile memory; erasing both volatile and non-volatile memory; performing a shut-down operation; performing a self-destruct; and implementing an active data transfer countermeasure.

Performing an intrusion response action comprises: determining an extent of the intrusion; mediating the intrusions, wherein the mediating is based at least in part on the extent determination; verifying a success status of the mediating; returning to normal operation; and alerting an external entity of intrusion.

In some embodiments, a method for programming a remotely configurable SE-SiP is provided. The method may comprise initializing a programmable hardware device (e.g., an init CLD or FPGA) using a verified initial configuration memory of the SE-SiP, wherein the programmable hardware device has an existing (e.g., factory programmed) configuration in memory and/or BIOS storage; verifying the content of the initial configuration memory (and, e.g., BIOS storage) with a trust component of the SE-SiP; retrieving data (e.g., instructions to startup component, instructions for the init CLD, configuration data for main CLD, BIOS and/or OS for new element created on main CLD, or other data such as verification code or generic data); verifying the data; storing the retrieved and verified data in a main configuration memory (e.g., in main BIOS storage and OS storage); and configuring a main programmable hardware device using the main configuration memory and an initialization programmable hardware device.

In some embodiments, the initializing comprising executing a power sequence.

In some embodiments, the method described above may be performed by a SE-SiP.

An Init Config Memory and/or an Init Config Sequential Loader may be arranged to configure an Init CLD (or FPGA) to act as a configuration loader for a Main CLD (or FPGA).

In another aspect, an apparatus is provided. The apparatus may comprise at least one startup component, at least one programmable hardware device, and at least one trust component. Said at least one startup component, said at least one programmable hardware device, and said at least one trust component are packaged together to form a System-in-Package (SiP) device.

The apparatus may further comprise at least one SiP substrate. Said at least one startup component, said at least one programmable hardware device, and said at least one trust component are mounted on said at least one SiP substrate and operatively interconnected using one or more connections of said at least one SiP substrate.

The SiP device may have only one input/output (I/O) port, and the I/O port may be connected to said at least one programmable hardware device.

Said at least one startup component may be adapted to configure said at least one programmable hardware device to execute a power-up or reset sequence stored in the startup component or associated memory.

Said at least one trust component may be adapted to perform any one or more of the following functions: (i) monitoring and verifying initialization of said at least one programmable hardware device where the apparatus is powered up or is reset, (ii) monitoring and verifying setup of said at least one programmable hardware device where the apparatus is powered up or is reset, or (iii) monitoring communications on the I/O port.

Said at least one programmable hardware device may comprise one or more field-programmable gate arrays (FPGAs).

Said at least one programmable hardware device may comprise an initialization configurable device and a main configurable device. The apparatus may further comprise an initialization configuration memory storing configurations for the initialization configurable device, an initialization configuration sequential loader capable of executing a power-up sequence for the apparatus and communicating with the initialization configuration memory, and a main configuration memory storing configurations for the main configurable device.

The apparatus may further comprise an operating system (OS) storage in communication with the initialization configurable logic device and the main configurable logic device, a first RAM in communication with the main configurable logic device, a main BIOS storage in communication with both of the initialization configurable logic device and the main configurable logic device, a second RAM in communication with the initialization configurable logic device, and an initialization BIOS storage in communication with the initialization configurable device. The first RAM and the second RAM may be the same RAM or different RAMs.

The apparatus may further comprise a privacy and integrity mechanism (PIM) comprising one or more conductors.

The PIM may further comprise a plurality of serpentine electrodes, a capacitive mesh fabric, or a two-plate capacitive arrangement.

Said at least one programmable hardware device may be configured to measure one or more of resistance, capacitance, inductance, or frequency using the serpentine electrodes, the capacitive mesh fabric, or the two-plate capacitive arrangement, thereby capable of detecting an attempted access of the apparatus.

The two-plate capacitive arrangement may comprise a first capacitive element and a second capacitive element, and the first capacitive element may be a porous plate or a plurality of overlapping or woven bond wires.

One or more packaged electrical components included in the SiP may form a dielectric between the first and second capacitive elements.

The PIM may be capable of performing any one or more of the following functions: (i) preventing external observation, (ii) preventing emission of radiation, or (iii) providing heat management.

The SiP in which said at least one startup component, said at least one programmable hardware device, and said at least one trust component may be packaged together is a first SiP. The apparatus may be a second SiP that includes the first SiP, the plurality of serpentine electrodes, the capacitive mesh fabric, or the two-plate capacitive arrangement may be formed on one or more of exterior surfaces of the first SiP, and the plurality of serpentine electrodes, the capacitive mesh fabric, or the two-plate capacitive arrangement may be formed inside the second SiP.

The apparatus may be configured to: measure one or more of resistance, capacitance, inductance, or frequency using the serpentine electrode or the two-plate capacitive arrangement, detect an attempted access of the apparatus, and respond to the detected attempted access.

The apparatus may be configured to respond to the detected attempted access by taking any one or more of the following actions: erasing all non-volatile memory, erasing both volatile and non-volatile memory, performing a shut-down operation, performing a self-destruct; or implementing an active data transfer countermeasure.

In another aspect, a method is provided. The method may be performed by a System-in-Package (SiP) device comprising at least one startup component, at least one programmable hardware device, and at least one trust component. The method comprises performing a power-up or a reset and said at least one startup component configuring said at least one programmable hardware device to execute a stored power-up sequence or a stored reset sequence in response to performing the power-up or the reset. The method further comprises said at least one trust component verifying initialization or setup of said at least one programmable hardware device and performing one or more input output operations after said at least one trust component successfully verifies the initialization or the setup of said at least one programmable hardware device.

In another aspect, a method of programming a remotely configurable Secure Enclave System in Package (SE-SiP) is provided. The method may comprise initializing a programmable hardware device using a verified initial configuration memory included in the SE-SiP. The programmable hardware device may have an existing configuration in any one or more of memory or BIOS storage. The method further comprise verifying content of the initial configuration memory with a trust component included in the SE-SiP, retrieving data, verifying the data, storing the retrieved and verified data in a main configuration memory, and configuring a main programmable hardware device using the main configuration memory and the initialized programmable hardware device.

While various embodiments of the present disclosure are described herein, it should be understood that they have been presented by way of example only, and not limitation. Thus, the breadth and scope of the present disclosure should not be limited by any of the herein above-described exemplary embodiments. Moreover, any combination of the herein above-described elements in all possible variations thereof is encompassed by the disclosure unless otherwise indicated herein or otherwise clearly contradicted by context. Accordingly, other embodiments, variations, and improvements not described herein are not excluded from the scope of the present disclosure. Such variations include but are not limited to new substrate material, different kinds of devices attached to the substrate not discussed, or new packaging concepts.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. An apparatus, comprising:
   at least one startup component;
   at least one configurable hardware device;
   at least one trust component; and
   at least one SiP substrate, wherein said at least one startup component, said at least one configurable hardware device, and said at least one trust component are mounted on said at least one SiP substrate and operatively interconnected, and
   wherein said at least one startup component, said at least one configurable hardware device, and said at least one trust component are packaged together to form a first System-in-Package (SiP) device, and
   wherein the apparatus is a second SiP device that includes the first SiP device.

2. The apparatus of claim 1, wherein the trust component is implemented in a configurable logic device of the first SiP device.

3. The apparatus of claim 1, wherein
   the first SiP device has only one input/output (I/O) port, and
   the I/O port is connected to said at least one configurable hardware device.

4. The apparatus of claim 1, wherein said at least one startup component is adapted to configure said at least one configurable hardware device to execute a power-up or reset sequence stored in the startup component or associated memory.

5. The apparatus of claim 1, wherein said at least one configurable hardware device comprises one or more field-programmable gate arrays (FPGAs).

6. The apparatus of claim 1, wherein a plurality of serpentine electrodes, a capacitive mesh fabric, or a two-plate capacitive arrangement is formed on one or more exterior surfaces of the first SiP device, and the plurality of serpentine electrode, the capacitive mesh fabric, or the two-plate capacitive arrangement is formed inside the second SiP device.

7. The apparatus of claim 4, wherein the trust component is adapted to perform one or more of the following functions: (i) monitor and verify initialization and/or setup of said at least one configurable hardware device where the apparatus is powered up or is reset, (ii) monitor and verify setup of said at least one configurable hardware device where the apparatus is powered up or is reset, or (iii) monitor communications on the I/O port.

8. An apparatus, comprising:
   at least one startup component;
   at least one configurable hardware device;
   at least one trust component; and
   at least one SiP substrate, wherein said at least one startup component, said at least one configurable hardware device, and said at least one trust component are mounted on said at least one SiP substrate and operatively interconnected, and
   wherein said at least one startup component, said at least one configurable hardware device, and said at least one trust component are packaged together to form a first System-in-Package (SiP) device, wherein
   said at least one configurable hardware device comprises an initialization configurable logic device and a main configurable logic device,
   the apparatus further comprising:
   an initialization configuration memory storing configurations for the initialization configurable logic device;
   an initialization configuration sequential loader capable of executing a power-up sequence for the apparatus and communicating with the initialization configuration memory; and
   a main configuration memory storing configurations for the main configurable logic device.

9. The apparatus of claim 8, further comprising:
   an operating system (OS) storage in communication with the initialization configurable logic device and the main configurable logic device;
   a first RAM in communication with the main configurable logic device;
   a main BIOS storage in communication with both of the initialization configurable logic device and the main configurable logic device;
   a second RAM in communication with the initialization configurable logic device; and
   an initialization BIOS storage in communication with the initialization configurable logic device, wherein the first RAM and the second RAM are the same RAM or different RAM.

10. The apparatus of claim 8, further comprising a privacy and integrity mechanism (PIM) comprising one or more conductors.

11. An apparatus, comprising:
   at least one startup component;
   at least one configurable hardware device;
   at least one trust component;
   a privacy and integrity mechanism (PIM) comprising a plurality of serpentine electrodes, a capacitive mesh fabric, or a two-plate capacitive arrangement; and
   at least one SiP substrate, wherein said at least one startup component, said at least one configurable hardware device, and said at least one trust component are mounted on said at least one SiP substrate and operatively interconnected, and wherein said at least one startup component, said at least one configurable hardware device, and said at least one trust component are packaged together to form a first System-in-Package (SiP) device.

12. The apparatus of claim 11, wherein said at least one configurable hardware device or startup component is configured to measure one or more of resistance, capacitance, inductance, or frequency using the serpentine electrodes, capacitive mesh fabric, or two-plate capacitive arrangement, thereby capable of detecting an attempted access of the apparatus.

13. The apparatus of claim 11, wherein
the two-plate capacitive arrangement comprises a first capacitive element and a second capacitive element, and
the first capacitive element is a porous plate or a plurality of overlapping or woven bond wires.

14. The apparatus of claim 13, wherein one or more packaged electrical components included in the SiP forms a dielectric between the first and second capacitive elements.

15. The apparatus of claim 11, wherein the PIM is capable of performing any one or more of the following functions: (i) preventing external observation (ii) preventing emission of radiation, or (iii) providing heat management.

16. An apparatus, comprising:
at least one startup component;
at least one configurable hardware device;
at least one trust component; and
at least one SiP substrate, wherein said at least one startup component, said at least one configurable hardware device, and said at least one trust component are mounted on said at least one SiP substrate and operatively interconnected, and
wherein said at least one startup component, said at least one configurable hardware device, and said at least one trust component are packaged together to form a first System-in-Package (SiP) device,
wherein the apparatus is configured to:
measure one or more of resistance, capacitance, inductance, or frequency using a serpentine electrode, a capacitive mesh fabric, or a two-plate capacitive arrangement,
detect an attempted access of the apparatus based at least in part on the measurement, and
respond to the detected attempted access.

17. The apparatus of claim 16, wherein the apparatus is configured to respond to the detected attempted access by taking any one or more of the following actions:
erasing all non-volatile memory;
erasing both volatile and non-volatile memory;
performing a shut-down operation;
performing a self-destruct; or
implementing an active data transfer countermeasure.

18. An apparatus, comprising:
at least one startup component;
at least one configurable hardware device;
at least one trust component; and
at least one SiP substrate, wherein said at least one startup component, said at least one configurable hardware device, and said at least one trust component are mounted on said at least one SiP substrate and operatively interconnected, and
wherein said at least one startup component, said at least one configurable hardware device, and said at least one trust component are packaged together to form a first System-in-Package (SiP) device,
wherein said at least one startup component is adapted to configure said at least one configurable hardware device to execute a power-up or reset sequence stored in the startup component or associated memory, and
wherein the trust component is adapted to perform one or more of the following functions: (i) monitor and verify initialization and/or setup of said at least one configurable hardware device where the apparatus is powered up or is reset, (ii) monitor and verify setup of said at least one configurable hardware device where the apparatus is powered up or is reset, or (iii) monitor communications on the I/O port.

\* \* \* \* \*